United States Patent
Mizutani

(10) Patent No.: US 10,783,789 B2
(45) Date of Patent: Sep. 22, 2020

(54) LANE CHANGE ESTIMATION DEVICE, LANE CHANGE ESTIMATION METHOD, AND STORAGE MEDIUM

(71) Applicant: HONDA MOTOR CO., LTD., Minato-ku, Tokyo (JP)

(72) Inventor: Akira Mizutani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 15/901,981

(22) Filed: Feb. 22, 2018

(65) Prior Publication Data
US 2018/0253975 A1   Sep. 6, 2018

(30) Foreign Application Priority Data

Mar. 1, 2017   (JP) .................................. 2017-038547

(51) Int. Cl.
*G08G 1/16* (2006.01)
*B60W 30/095* (2012.01)

(52) U.S. Cl.
CPC ......... *G08G 1/167* (2013.01); *B60W 30/0956* (2013.01); *B60W 2420/42* (2013.01); *B60W 2420/52* (2013.01); *B60W 2554/80* (2020.02); *B60W 2710/18* (2013.01); *B60W 2710/20* (2013.01)

(58) Field of Classification Search
None
See application file for complete search history.

(56) References Cited

U.S. PATENT DOCUMENTS

| 2015/0266477 A1* | 9/2015 | Schmudderich | B60W 40/04 701/98 |
| 2015/0321699 A1* | 11/2015 | Rebhan | B60W 10/20 701/23 |
| 2017/0021864 A1 | 1/2017 | Sonntag et al. | |

FOREIGN PATENT DOCUMENTS

| JP | 2003-288691 | 10/2003 |
| JP | 2010-006271 | 1/2010 |
| JP | 2011-123714 | 6/2011 |

(Continued)

OTHER PUBLICATIONS

Japanese Notice of Allowance for Japanese Patent Application No. 2017-038547 dated Feb. 5, 2019.

*Primary Examiner* — Jonathan M Dager
*Assistant Examiner* — Garrett F Evans
(74) *Attorney, Agent, or Firm* — Amin, Turocy & Watson, LLP

(57) ABSTRACT

A lane change estimation device includes a detection unit that detects a surrounding situation of an own-vehicle, a first index value deriving unit that derives a first index value according to a traveling-direction-related relationship between each of a plurality of pairs of vehicles, each pair including two vehicles among the own-vehicle, a first vehicle traveling in front of the own-vehicle in a first lane in which the own-vehicle travels, a second vehicle traveling in front of the own-vehicle in a second lane adjacent to the first lane, and a third vehicle traveling behind the second vehicle in the second lane on the basis of the surrounding situation of the own-vehicle, and an estimation unit that estimates a probability of lane change of the third vehicle on the basis of the first index value derived and a lateral position of the third vehicle.

18 Claims, 15 Drawing Sheets

(56) References Cited

FOREIGN PATENT DOCUMENTS

| | | |
|---|---|---|
| WO | 2011/158307 | 12/2011 |
| WO | 2017/010349 | 1/2017 |

\* cited by examiner

152

| FIRST INDEX VALUE \ TTCS OF VEHICLES | M, m1 | M, m3 | m1, m3 | m2, m3 |
|---|---|---|---|---|
| α1 | 0.0-1.0 | 0.0-0.5 | 0.0-1.0 | 0.0-1.0 |
| α2 | 0.0-1.0 | 0.5-1.0 | 0.0-1.0 | 0.0-1.0 |
| α3 | 0.0-1.0 | 1.0-1.5 | 0.0-1.0 | 0.0-1.0 |
| ⋮ | ⋮ | ⋮ | ⋮ | ⋮ |
| αn | GREATER THAN OR EQUAL TO N | GREATER THAN OR EQUAL TO N | GREATER THAN OR EQUAL TO N | GREATER THAN OR EQUAL TO N |

LANE CHANGE ESTIMATION DEVICE, LANE CHANGE ESTIMATION METHOD, AND STORAGE MEDIUM

CROSS-REFERENCE TO RELATED APPLICATION

Priority is claimed on Japanese Patent Application No. 2017-038547, filed Mar. 1, 2017, the content of which is incorporated herein by reference.

BACKGROUND OF THE INVENTION

Field of the Invention

The present invention relates to a lane change estimation device, a lane change estimation method, and a storage medium.

Description of Related Art

Technologies for calculating the probability that a nearby vehicle will turn in front of an own-vehicle using a first distance between the own-vehicle and a preceding vehicle that travels in front of the own-vehicle in the same lane as that in which the own-vehicle travels, a second distance between the nearby vehicle which travels in a lane adjacent to the lane of the own-vehicle and a vehicle that travels behind the nearby vehicle, and the relative velocity between the own-vehicle and the nearby vehicle have been disclosed in the related art (see, for example, Japanese Unexamined Patent Application, First Publication No. 2003-288691).

SUMMARY

However, such technologies of the related art sometimes cannot accurately derive the probability of lane change of nearby vehicles.

The present invention has been made in view of the above circumstances and it is an object of the present invention to provide a lane change estimation device, a lane change estimation method, and a storage medium which can more accurately derive the probability of lane change of nearby vehicles.

The lane change estimation device, the lane change estimation method, and the storage medium according to the present invention employ the following configurations.

(1) A lane change estimation device according to an aspect of the present invention includes: a detection unit configured to detect a surrounding situation of an own-vehicle; a first index value deriving unit configured to derive a first index value according to a traveling-direction-related relationship between each of a plurality of pairs of vehicles, each pair including two vehicles among the own-vehicle, a first vehicle traveling in front of the own-vehicle in a first lane in which the own-vehicle travels, a second vehicle traveling in front of the own-vehicle in a second lane adjacent to the first lane, and a third vehicle traveling behind the second vehicle in the second lane on the basis of the surrounding situation of the own-vehicle detected by the detection unit; and an estimation unit configured to estimate a probability of lane change of the third vehicle on the basis of the first index value derived by the first index value deriving unit and a lateral position of the third vehicle.

In the above aspect (1), (2) further comprising a second index value deriving unit configured to derive a second index value relating to the third vehicle on the basis of the lateral position of the third vehicle and at least one of the amount of lateral movement of the third vehicle in a predetermined period or a lateral movement velocity of the third vehicle, wherein the estimation unit is configured to estimate a probability of lane change of the third vehicle on the basis of the first index value derived by the first index value deriving unit and the second index value derived by the second index value deriving unit.

In the above aspect (1) or (2), (3) wherein the first index value is an index value according to one or more of the group consisting of a time until the two vehicles approach a predetermined distance, a distance between the two vehicles, a headway time of the two vehicles, and a relative velocity of the two vehicles.

In the above aspect (1) or (2), (4) The lane change estimation device according to claim 1, wherein the estimation unit is configured to estimate a higher probability of lane change of the third vehicle when a relative velocity of the second vehicle with respect to the first vehicle is greater than zero or equal to zero than when the relative velocity of the second vehicle with respect to the first vehicle is less than zero.

In the above aspect (1) or (2), (5) The lane change estimation device according to claim 1, wherein the first index value deriving unit is configured to derive the first index value on the basis of a travel-direction-related relationship between each of the pairs of vehicles excluding a travel-direction-related relationship of the first vehicle and the second vehicle.

In the above aspect (1) or (2), (6) The lane change estimation device according to claim 1, wherein the first index value deriving unit is configured to derive the first index value on the basis of a first time until the own-vehicle and the first vehicle approach a predetermined distance and a second time until the second vehicle and the third vehicle approach the predetermined distance, and the estimation unit is configured to estimate a higher probability of lane change of the third vehicle when the first time is longer than the second time than when the first time is shorter than the second time.

In the above aspect (1) or (2), (7) The lane change estimation device according to claim 1, wherein the estimation unit is configured to estimate a higher probability of lane change of the third vehicle when a movement direction of the third vehicle in a lateral direction is toward the first lane than when the movement direction of the third vehicle in the lateral direction is not toward the first lane.

In the above aspect (1) or (2), (8) The lane change estimation device according to claim 1, wherein the estimation unit is configured to estimate a higher probability of lane change of the third vehicle when a direction indicator of the third vehicle indicates an intention to enter the first lane than when the direction indicator of the third vehicle does not indicate the intention to enter the first lane.

In the above aspect (1) or (2), (9) The lane change estimation device according to claim 1, wherein the estimation unit is configured to estimate a higher probability of lane change of the third vehicle when an obstacle is present in front of the third vehicle than when no obstacle is present in front of the third vehicle.

In the above aspect (1) or (2), (10) The lane change estimation device according to claim 1, wherein the estimation unit is configured to estimate a higher probability of lane change of the third vehicle when a lane in front of the third vehicle is closed than when the lane in front of the third vehicle is not closed.

(11) A lane change estimation method according to an aspect of the present invention includes: an in-vehicle computer detecting a surrounding situation of an own-vehicle; deriving a first index value according to a traveling-direction-related relationship between each of a plurality of pairs of vehicles, each pair including two vehicles among the own-vehicle, a first vehicle traveling in front of the own-vehicle in a first lane in which the own-vehicle travels, a second vehicle traveling in front of the own-vehicle in a second lane adjacent to the first lane, and a third vehicle traveling behind the second vehicle in the second lane on the basis of the surrounding situation of the detected own-vehicle; and estimating a probability of lane change of the third vehicle on the basis of the derived first index value and a lateral position of the third vehicle.

(12) A storage medium configured to store a vehicle control program causing an in-vehicle computer to: detect a surrounding situation of an own-vehicle; derive a first index value according to a traveling-direction-related relationship between each of a plurality of pairs of vehicles, each pair including two vehicles among the own-vehicle, a first vehicle traveling in front of the own-vehicle in a first lane in which the own-vehicle travels, a second vehicle traveling in front of the own-vehicle in a second lane adjacent to the first lane, and a third vehicle traveling behind the second vehicle in the second lane on the basis of the surrounding situation of the detected own-vehicle; and estimate a probability of lane change of the third vehicle on the basis of the derived first index value and a lateral position of the third vehicle.

According to the above aspects (1) to (12), the estimation unit estimates the probability of lane change of the third vehicle on the basis of the first index value derived by the first index value deriving unit and the lateral position of the third vehicle and thus it is possible to more accurately derive the probability of lane change of nearby vehicles.

DETAILED DESCRIPTION OF THE INVENTION

Hereinafter, embodiments of a lane change estimation device, a lane change estimation method, and a storage medium of the present invention will be described with reference to the drawings. In the following description, the lane change estimation device will be described as being applied to an automated driving vehicle. However, without being limited to this, the lane change estimation device may be applied to a notification device that, when there is a vehicle estimated to have a high probability of changing lanes to a lane in which an own-vehicle travels, notifies an occupant of the own-vehicle of the presence of the vehicle estimated to have a high probability of changing lanes. Without being limited to the automated driving vehicle, the lane change estimation device may be applied to a vehicle that follows a preceding vehicle traveling in front of the own-vehicle. Following travel is a mode in which a vehicle travels behind a preceding vehicle while keeping a predetermined inter-vehicle distance from the preceding vehicle. In this case, when notified by the lane change estimation device that there is a vehicle having a high probability of changing lanes from a lane adjacent to the lane in which the own-vehicle travels to the lane in which the own-vehicle travels, the own-vehicle travels at a longer inter-vehicle distance from the preceding vehicle that the own-vehicle is following.

[Overall Configuration]

Figure 1:
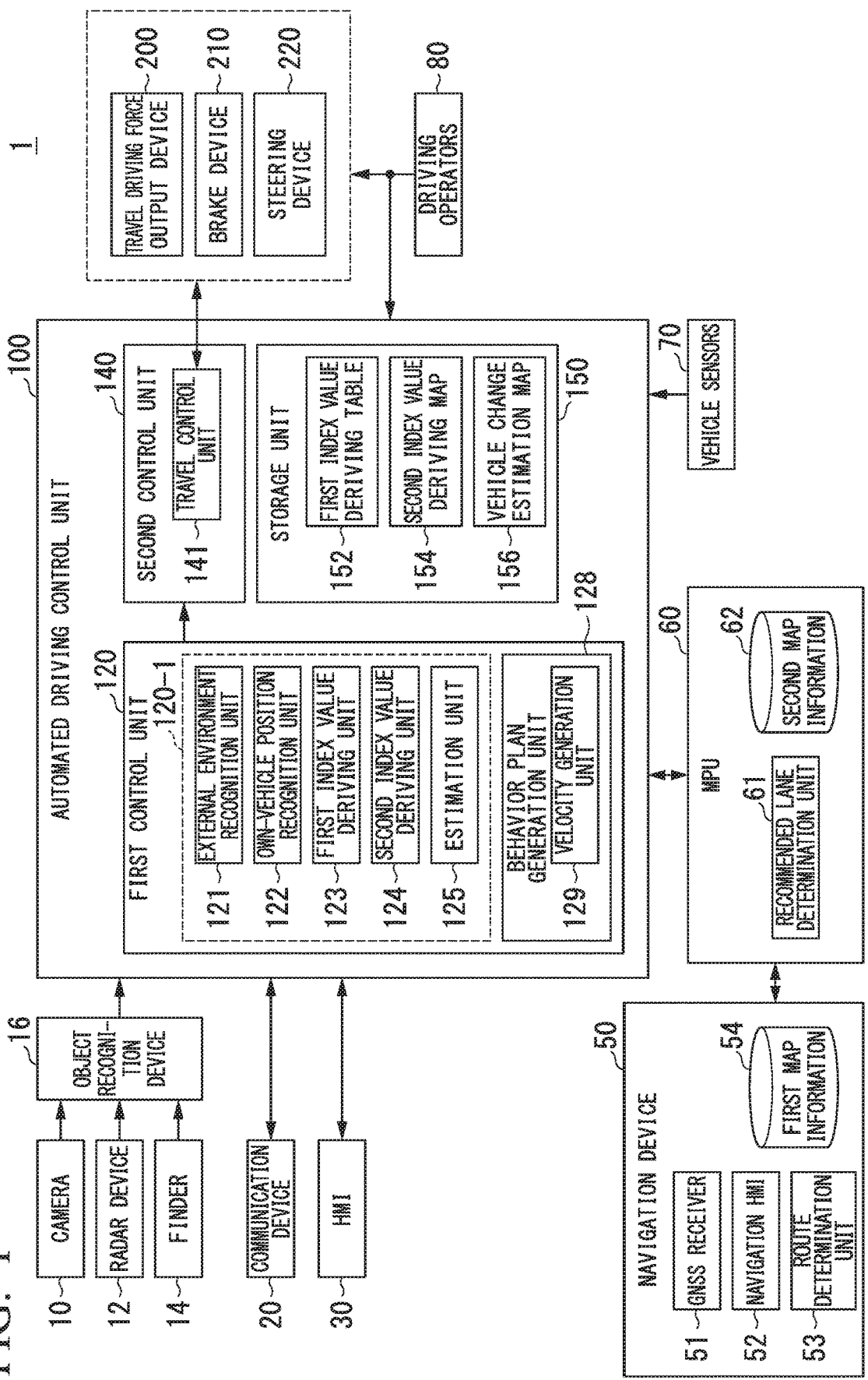
FIG. 1 is a configuration diagram of a vehicle system including an automated driving control unit.

FIG. 1 is a configuration diagram of a vehicle system 1 including an automated driving control unit 100. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, vehicle sensors 70, driving operators 80, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 may be attached to arbitrary locations of the vehicle in which the vehicle system 1 is mounted (hereinafter referred to as an own-vehicle M). For imaging the area in front of the vehicle, a camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar device 12 radiates radio waves such as millimeter waves around the own-vehicle M and detects radio waves reflected by an object (reflected waves) to detect at least the position (distance and orientation) of the object. One or a plurality of radar devices 12 may be attached to the own-vehicle M at arbitrary locations. The radar device 12 may detect the position and velocity of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own-vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles near the own-vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the vehicle and receives an input operation from the occupant. The HMI 30 includes any of various display devices, a speaker, a buzzer, a touch panel, a switch, a key, or the like.

The navigation device 50 includes, for example, a global navigation satellite system (GNSS) receiver 51, a navigation HMI 52, and a route determination unit 53 and holds first map information 54 in a storage device such as a hard disk drive (HDD) or a flash memory. The GNSS receiver specifies the position of the own-vehicle M on the basis of signals received from GNSS satellites. The position of the own-vehicle M may also be specified or may be supplemented by an inertial navigation system (INS) using the output of the vehicle sensors 70. The navigation HMI 52 includes a display device, a speaker, a touch panel, a key, or the like. The navigation HMI 52 may be partly or wholly shared with the HMI 30 described above. For example, the route determination unit 53 determines a route from the position of the own-vehicle M specified by the GNSS receiver 51 (or an arbitrary input position) to a destination input by the occupant using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The route determined by the route determination unit 53 is output to the MPU 60. The navigation device 50 may also perform route guidance using the navigation HMI 52 on the basis of the route determined by the route determination unit 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determination unit 61 and holds the second map information 62 in a storage device such as an HDD or a flash memory. The recommended lane determination unit 61 divides the route provided from the navigation device 50 into a plurality of blocks (for example, into blocks each 100 meters long in the direction in which the vehicle travels) and determines a recommended lane for each block by referring to the second map information 62. The recommended lane determination unit 61 determines the recommended lane such that the recommended lane is given a position in a lane order counted from the leftmost lane. When there is a branch point, a merge point, or the like on the route, the recommended lane determination unit 61 determines a recommended lane such that the own-vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

Information indicating a gate structure such as an entrance toll gate or an exit toll gate is stored in the second map information 62. The information indicating the gate structure is, for example, the number of gates provided at a toll gate, information indicating the positions of the gates, or information indicating the types of the gates (information such as an ETC exclusive gate or a general gate).

The vehicle sensors 70 include a vehicle speed sensor that detects the speed of the own-vehicle M, an acceleration sensor that detects an acceleration of the own-vehicle M, a yaw rate sensor that detects an angular speed thereof about the vertical axis, an orientation sensor that detects the orientation of the own-vehicle M, or the like.

The driving operators 80 include, for example, an accelerator pedal, a brake pedal, a shift lever, a steering wheel, and other operators. A sensor for detecting the amount of operation or the presence or absence of operation is attached to each of the driving operators 80 and detection results thereof are output to either or both of the automated driving control unit 100 or the travel driving force output, brake, and steering devices 200, 210, and 220.

The automated driving control unit 100 includes, for example, a first control unit 120, a second control unit 140, and a storage unit 150. Each of the first control unit 120 and the second control unit 140 is realized by a processor such as a central processing unit (CPU) executing a program (software). Some or all of the functional units may be realized by hardware such as a large scale integration (LSI), an application specific integrated circuit (ASIC), or a field-programmable gate array (FPGA) or may be realized by cooperation of hardware and software. The program may be stored in a storage device such as a hard disk drive (HDD) or a flash memory in advance or may be stored in a detachable storage medium such as a DVD or a CD-ROM and then installed on the storage device by inserting the storage medium into a drive device. The storage unit 150 is realized by an HDD or a flash memory. A first index value deriving table 152, a second index value deriving map 154, and a lane change estimation map 156 which will be described later are stored in the storage unit 150.

The first control unit 120 includes, for example, an external environment recognition unit 121, an own-vehicle position recognition unit 122, a first index value deriving unit 123, a second index value deriving unit 124, an estimation unit 125, and a behavior plan generation unit 128. A combination of the external environment recognition unit 121, the own-vehicle position recognition unit 122, the first index value deriving unit 123, the second index value deriving unit 124, and the estimation unit 125 is an example of a "lane change estimation device" (shown as "120-1" in the figure). A combination of the external environment recognition unit 121 and the own-vehicle position recognition unit 122 is an example of a "detection unit." A combination of the behavior plan generation unit 128 and the second control unit 140 is an example of a "vehicle control unit."

The external environment recognition unit 121 recognizes states of a nearby vehicle(s) such as the position, speed and acceleration thereof on the basis of information input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognition unit 121 may also recognize the positions of guardrails or utility poles, parked vehicles, pedestrians, and other objects in addition to nearby vehicles.

The own-vehicle position recognition unit 122 recognizes, for example, a (traveling) lane in which the own-vehicle M travels and the relative position and attitude of the own-vehicle M with respect to the traveling lane. The own-vehicle position recognition unit 122 recognizes the traveling lane, for example, by comparing a pattern of road lane lines (for example, an arrangement of solid and broken lines) obtained from the second map information 62 with a pattern of road lane lines near the own-vehicle M recognized from an image captured by the camera 10. This recognition may be performed taking into account a position of the own-vehicle M acquired from the navigation device 50 or a result of processing by the INS.

Figure 2:
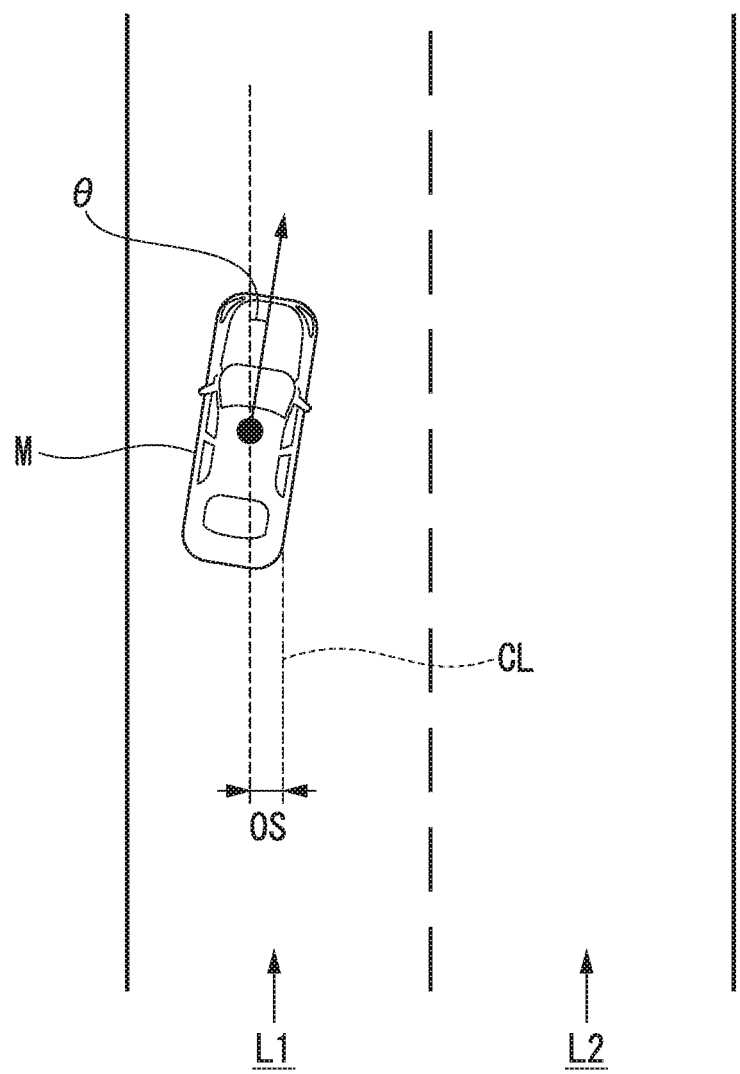
FIG. 2 is a diagram showing how the relative position and attitude of an own-vehicle M with respect to a traveling lane are recognized by an own-vehicle position recognition unit.

Then, the own-vehicle position recognition unit 122 recognizes, for example, the relative position or attitude of the own-vehicle M with respect to the traveling lane. FIG. 2 is a diagram showing how the relative position and attitude of the own-vehicle M with respect to the traveling lane L1 are recognized by the own-vehicle position recognition unit 122. For example, the own-vehicle position recognition unit 122 recognizes both a deviation OS from a traveling lane center CL of a reference point (for example, the center of gravity) of the own-vehicle M and an angle θ formed by the travel direction of the own-vehicle M relative to an extension line of the traveling lane center CL as the relative position and attitude of the own-vehicle M with respect to the traveling lane L1. Alternatively, the own-vehicle position recognition unit 122 may recognize, for example, the position of the reference point of the own-vehicle M with respect to one of the sides of the traveling lane L1 or the like as the relative position of the own-vehicle M with respect to the traveling lane. The relative position of the own-vehicle M recognized by the own-vehicle position recognition unit 122 is provided to the recommended lane determination unit 61 and the behavior plan generation unit 128.

Details of the first index value deriving unit 123, the second index value deriving unit 124, and the estimation unit 125 will be described later.

The behavior plan generation unit 128 determines events which are to be sequentially performed in automated driving such that the own-vehicle M travels in the recommended lane determined by the recommended lane determination unit 61 and copes with situations occurring near the own-vehicle M. The events include, for example, a constant-speed travel event which is an event of traveling in the same traveling lane at a constant speed, a following travel event which is an event of following a preceding vehicle, a lane change event, a merging event, a branching event, an emergency stop event, a handover event which is an event of terminating automated driving and switching to manual driving, and a toll gate event which is executed when passing through a toll gate (which will be described later). During execution of these events, behaviors for avoidance may sometimes be planned on the basis of situations occurring near the own-vehicle M (such as the presence of nearby vehicles and pedestrians or lane narrowing due to road construction).

The behavior plan generation unit 128 generates a target trajectory along which the own-vehicle M will travel in the future. The target trajectory includes, for example, velocity components. For example, the target trajectory is generated as a set of target points (trajectory points) to be reached at a plurality of future reference times which are set at intervals of a predetermined sampling time (for example, at intervals of about tenths of a second). Therefore, when the distance between trajectory points is great, this means that the vehicle travels at a high speed in the section between the trajectory points.

Figure 3:
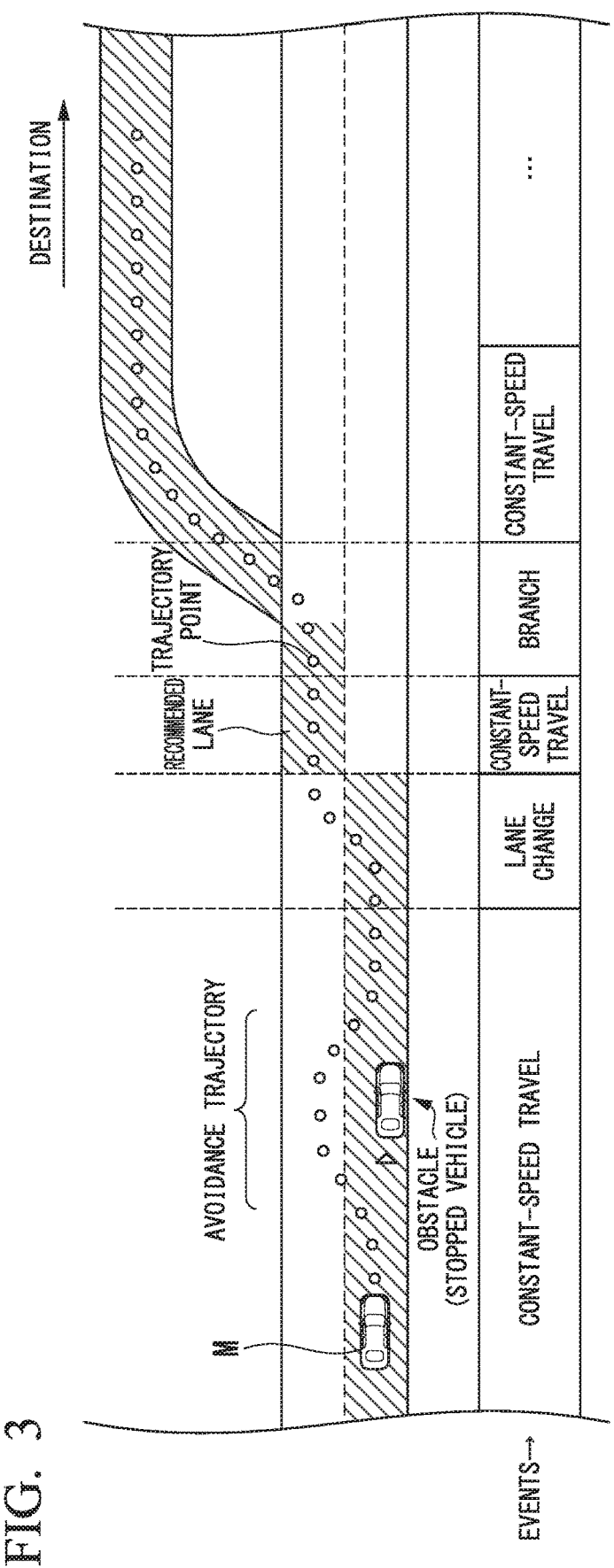
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own-vehicle M approaches a predetermined distance (which may be determined according to the types of events) before a point for switching to the recommended lane, the behavior plan generation unit 128 activates a lane change event, a branching event, a merging event, or the like. When it becomes necessary to avoid an obstacle during execution of each event, an avoidance trajectory is generated as shown in FIG. 3.

For example, the behavior plan generation unit 128 generates a plurality of candidate target trajectories and selects an optimum target trajectory at that time in view of safety and efficiency.

The behavior plan generation unit 128 includes a velocity generation unit 129. Details of the velocity generation unit 129 will be described later.

The second control unit 140 includes a travel control unit 141. The travel control unit 141 controls the travel driving force output device 200, the brake device 210, and the steering device 220 such that the own-vehicle M passes along the target trajectory generated by the behavior plan generation unit 128 at scheduled times.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel control unit 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel control unit 141 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel control unit 141 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the travel control unit 141 or information input from the driving operators 80 to change the direction of the steering wheels.

[Procedure for Estimating Probability of Lane Change]

Figure 4:
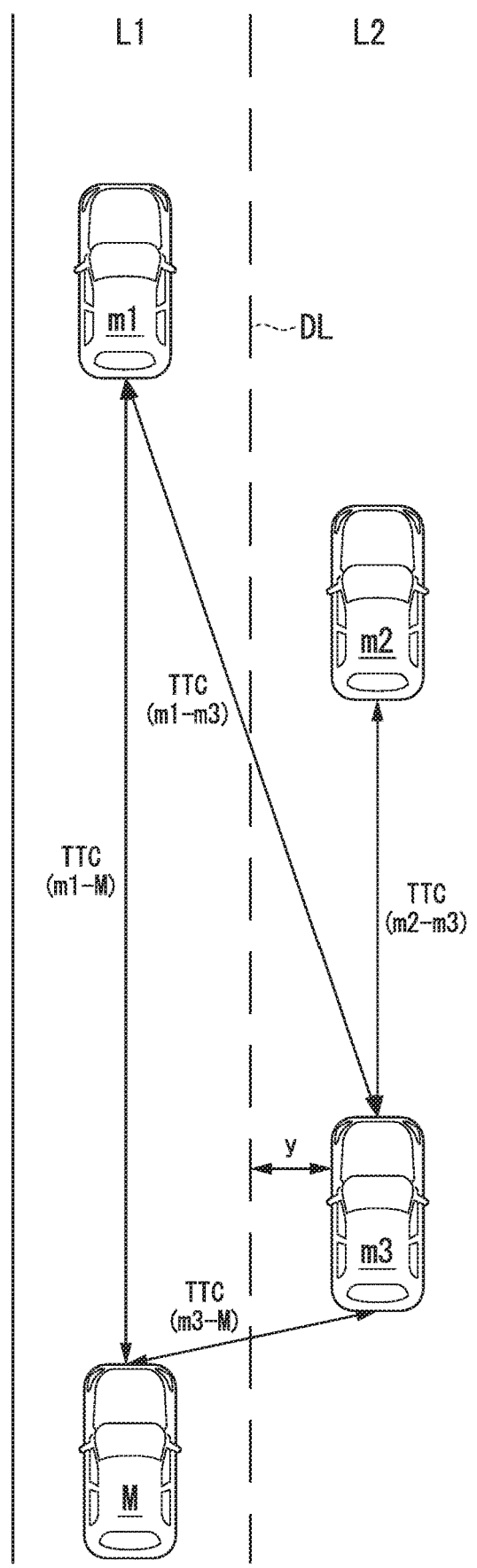
FIG. 4 is a diagram showing an example of a scenario in which a first control unit estimates the probability that a third vehicle will change lanes in front of the own-vehicle.

FIG. 4 is a diagram showing an example of a scenario in which the first control unit 120 estimates the probability that a third vehicle will change lanes in front of the own-vehicle M. On the basis of recognition results of the external environment recognition unit 121 and the own-vehicle position recognition unit 122, the first index value deriving unit 123 derives a first index value according to a traveling-direction-related relationship between each of a plurality of pairs of vehicles, each pair including two vehicles among the own-vehicle M, a first vehicle m1 traveling in front of the own-vehicle M in a first lane (a traveling lane) L1 in which the own-vehicle M travels, a second vehicle m2 traveling in front of the own-vehicle M in a second lane L2 adjacent to the first lane L1, and a third vehicle m3 traveling behind the second vehicle m2 in the second lane L2.

The first index value is an index value according to at least one of a time until the two vehicles approach a predetermined distance, a distance between the two vehicles, a headway time of the two vehicles, or a relative velocity of the two vehicles. The headway time is an arbitrarily set time (for example, about 1.5 or 2 seconds) with which a rear vehicle can be kept in a state where safety is secured without interfering with a preceding vehicle when the preceding vehicle has suddenly decelerated or has suddenly stopped.

The second index value deriving unit 124 derives a second index value relating to the third vehicle m3 on the basis of a lateral position of the third vehicle m3 and at least one of the amount of lateral movement of the third vehicle m3 in a predetermined period or a lateral movement velocity of the third vehicle m3 in a predetermined period.

The estimation unit 125 estimates the probability of lane change of the third vehicle m3 on the basis of the index value (i.e., the first index value) derived by the first index value deriving unit 123 and the lateral position of the third vehicle. The estimation unit 125 also estimates the probability of lane change of the third vehicle m3 on the basis of the first index value derived by the first index value deriving unit 123 and the second index value derived by the second index value deriving unit 124.

Figure 5:
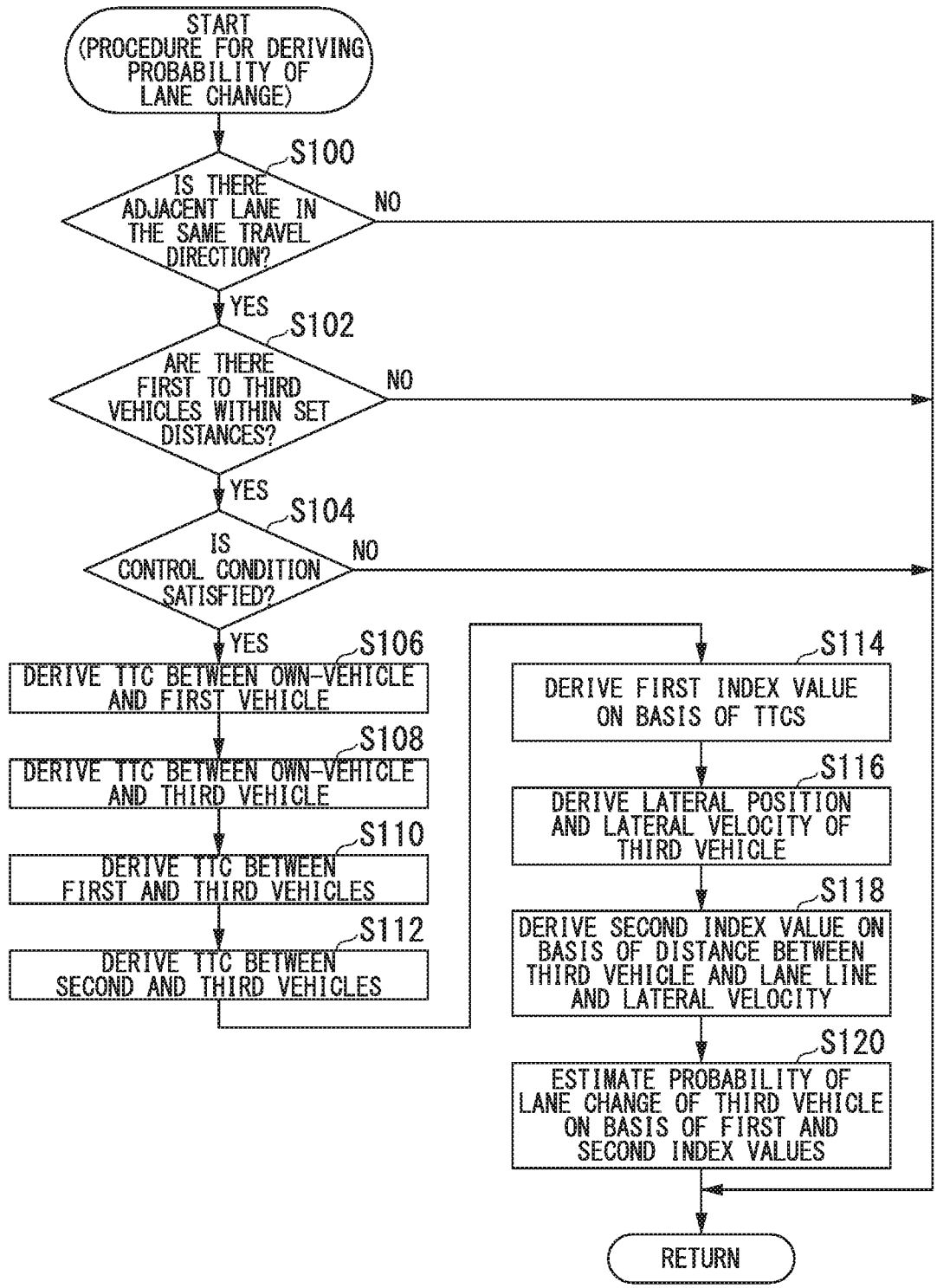
FIG. 5 is a flowchart showing the flow of a procedure performed by the first control unit.

FIG. 5 is a flowchart showing the flow of a procedure performed by the first control unit 120. This procedure is performed at predetermined intervals. Each process of the procedure will be described below with reference to FIG. 4 described above.

First, the first control unit 120 determines whether or not there is a second lane L2 in the same travel direction as the travel direction of the first lane L1 in which the own-vehicle M travels on the basis of the current position of the own-vehicle M and information acquired from the second map information 62 (step S100). When there is no second lane L2 in the same travel direction, the procedure of one routine of this flowchart ends.

When there is a second lane L2 in the same travel direction, the first control unit 120 determines whether or not first to third vehicles m1 to m3 are present within a set distance from the own-vehicle M on the basis of the recognition results of the external environment recognition unit 121 and the own-vehicle position recognition unit 122 (step S102). For example, the distance is set for each of the first to third vehicles m1 to m3. For example, the first index value deriving unit 123 determines whether or not each of the first to third vehicles m1 to m3 is present within a distance set for the corresponding vehicle. In the example of FIG. 4, it is assumed that the first to third vehicles m1 to m3 are present within distances set for the first to third vehicles.

The first control unit 130 also determines that the third vehicle m3 is present within the set distance even when the third vehicle m3 is present behind the own-vehicle M or is present laterally aside the own-vehicle M. When the first to third vehicles m1 to m3 are not present within predetermined distances from the own-vehicle M, the procedure of one routine of this flowchart ends.

When the first to third vehicles m1 to m3 are present within the predetermined distances from the own-vehicle M, the estimation unit 125 determines whether or not a predetermined control condition is satisfied (step S104). The predetermined control condition is, for example, that the inter-vehicle distance between the first vehicle m1 and the own-vehicle M is greater than or equal to a threshold value. For example, the predetermined control condition may be that the relative velocity of the third vehicle m3 with respect to the own-vehicle M is positive when the distance in the travel direction between the own-vehicle M and the third vehicle m3 is less than a first distance (i.e., when the inter-vehicle distance is short).

For example, the predetermined control condition may be that the relative velocity of the third vehicle m3 with respect to the own-vehicle M is positive and is also equal to or higher than a predetermined velocity when the distance in the travel direction between the own-vehicle M and the third vehicle m3 is greater than or equal to the first distance and less than a second distance (i.e., when the inter-vehicle distance is medium). When the distance in the travel direction between the own-vehicle M and the third vehicle m3 is greater than or equal to the second distance (i.e., when the inter-vehicle distance is sufficiently long), the estimation unit 125 determines that the predetermined control condition is satisfied even when the relative velocity of the third vehicle m3 with respect to the own-vehicle M is not positive since there is a sufficient region between the own-vehicle M and the third vehicle m3. When the predetermined control condition is not satisfied, the procedure of this flowchart ends.

When the predetermined control condition is satisfied, the first index value deriving unit 123 derives a TTC (m1-M) between the own-vehicle M and the first vehicle m1 (step S106). The time to collision (TTC) is a value obtained by dividing the inter-vehicle distance in the travel direction between (the rear end of) a preceding vehicle and (the front end of) a rear vehicle by the relative velocity.

Next, the first index value deriving unit 123 derives a TTC (M-m3) between the own-vehicle M and the third vehicle m3 (step S108), derives a TTC (m1-m3) between the first vehicle m1 and the third vehicle m3 (step S110), and derives a TTC (m2-m3) between the second vehicle m2 and the third vehicle m3 (step S112).

Figures 6, 7:
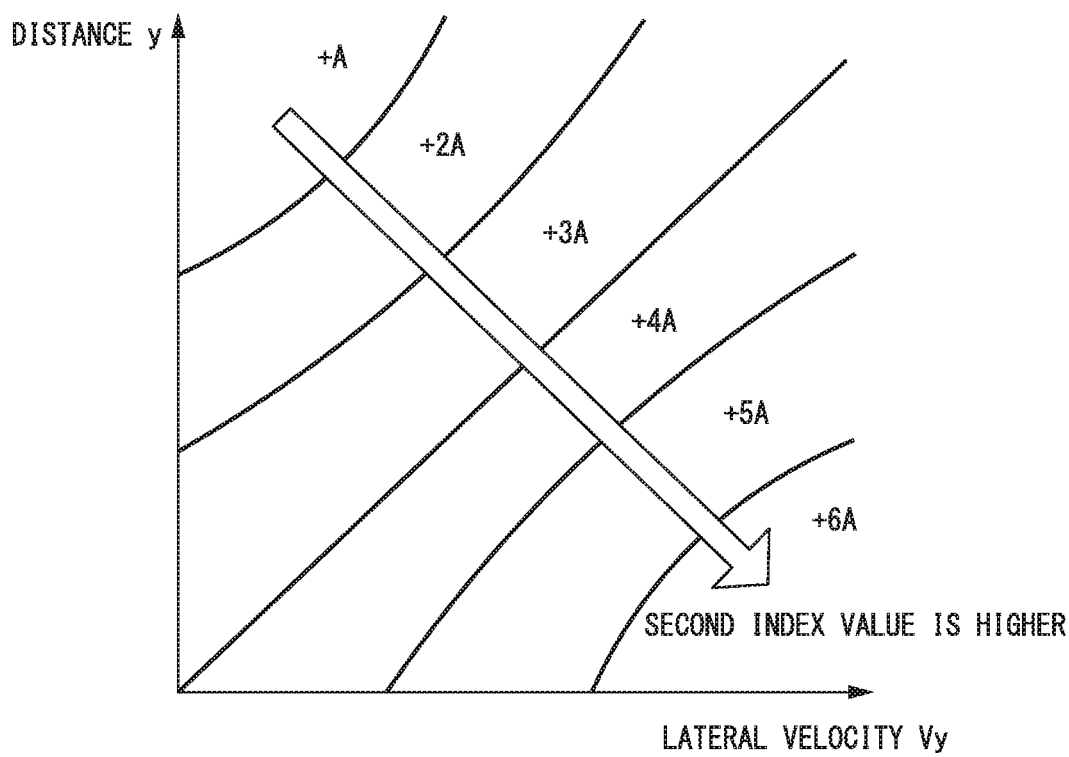
FIG. 6 is a diagram showing an example of a first index value deriving table.
FIG. 7 is a diagram showing an example of a second index value deriving map.

Next, the first index value deriving unit 123 derives the first index value on the basis of the TTCs derived through the processes of the above steps S106 to S112 and the first index value deriving table 152 (step S114). FIG. 6 is a diagram showing an example of the first index value deriving table 152. In the first index value deriving table 152, TTCs of a plurality of pairs of vehicles are stored in association with first index values α1 to αn. For example, the first index values increases in the order of α1 to α3.

The first index value when the TTC between the own-vehicle M and the first vehicle m1 is long tend to be greater than when the TTC is short. The first index value when the TTC between the first vehicle m1 and the third vehicle m3 is long tends to be greater than when the TTC is short. The first index value when the TTC between the second vehicle m2 and the third vehicle m3 is short tends to be greater than when the TTC is long. The first index value when the TTC between the own-vehicle M and the first vehicle m1 is longer than the TTC between the second vehicle m2 and the third vehicle m3 tends to be greater than when the TTC between the own-vehicle M and the first vehicle m1 is shorter than the TTC between the second vehicle m2 and the third vehicle m3.

The first index value deriving table 152 is generated on the basis of the correlations between the first index values and the TTCs of pairs of vehicles previously derived from results of observation of the third vehicle m3 which has actually changed lanes, experimental methods, simulations, or the like. The pairs of vehicles include, for example, a pair of the own-vehicle M and the first vehicle m1, a pair of the own-vehicle M and the third vehicle m3, a pair of the first vehicle m1 and the third vehicle m3, a pair of the second vehicle m2 and the third vehicle m3, excluding a pair of the first vehicle m1 and the second vehicle m2. Instead of (in addition to) the first index value deriving table 152, a map or a function may be used to derive the first index value.

Next, the first index value deriving unit 123 derives a lateral position and a lateral velocity Vy of the third vehicle m3 on the basis of the recognition result of the external environment recognition unit 121 (step S116). The lateral position of the third vehicle m3 is a position of the third vehicle m3 with respect to the first lane L1 in which the own-vehicle M travels and is also a distance y between the third vehicle m3 and a lane line DL that separates the first lane L1 and the second lane L2. The distance y is, for example, the shortest distance between one side of the third vehicle m3 and the lane line DL.

Next, the estimation unit 125 derives a second index value on the basis of both the distance y between the third vehicle m and the lane line DL and the lateral velocity Vy of the third vehicle m3 by referring to the second index value deriving map 154 (step S118). FIG. 7 is a diagram showing an example of the second index value deriving map 154. In the second index value deriving map 154, the distance y and the lateral velocity Vy of the third vehicle m3 (which is positive in the direction approaching the lane line DL) are stored in association with the second index value. In the figure, "A" is a set value. The second index value tends to increase as the distance y decreases. The second index value tends to increase as the lateral velocity Vy increases. The second index value deriving map 154 is generated on the basis of the correlations between the second index values, the distances y, and the lateral velocities Vy of the third vehicle m3 previously derived from results of observation of the third vehicle m3 which has actually changed lanes, experimental methods, simulations, or the like.

Figure 8:
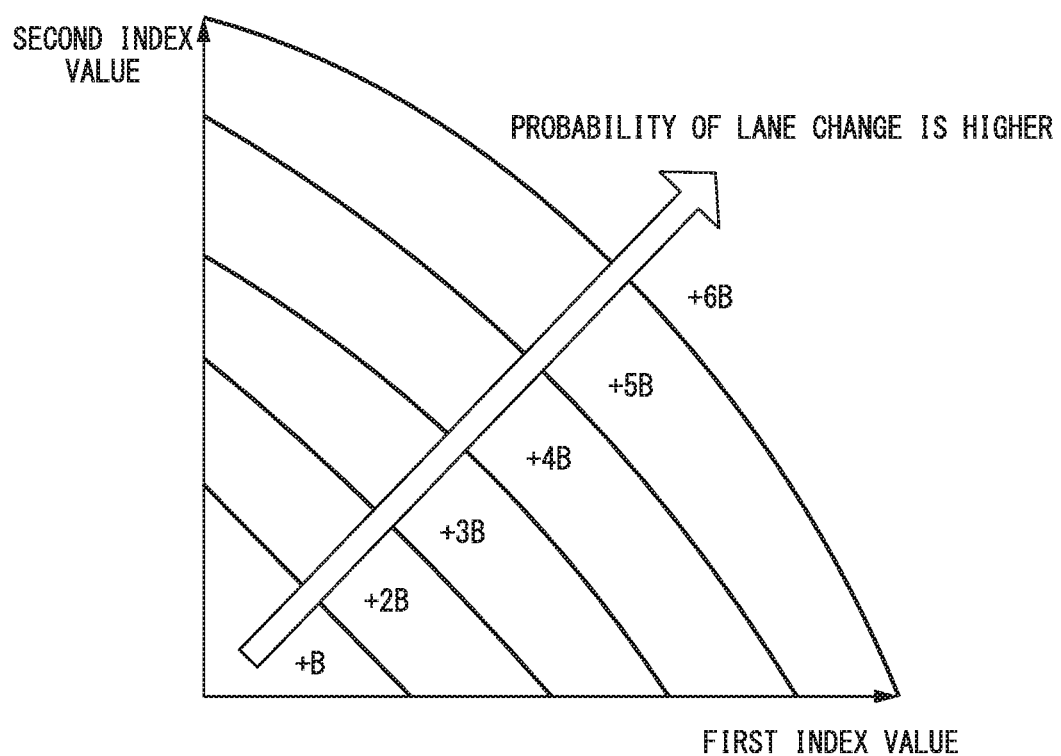
FIG. 8 is a diagram showing an example of a lane change estimation map.

Next, the estimation unit 125 estimates the probability of lane change of the third vehicle m3 to the first lane L1 on the basis of the first index value and the second index value by referring to the lane change estimation map 156 (step S120). FIG. 8 is a diagram showing an example of the lane change estimation map 156. In the lane change estimation map 156, the first index value and the second index value are stored in association with an estimated index value indicating the probability of lane change of the third vehicle m3. In the figure, "B" is a set value. The estimated index value tends to increase as the first index value or the second index value increases. The lane change estimation map 156 is generated on the basis of the correlations between the first index values and the second index values previously derived from results of observation of the third vehicle m3 which has actually changed lanes, experimental methods, simulations, or the like. Then, the procedure of one routine in this flowchart ends.

The above example has been described such that the distance y and the lateral velocity Vy of the third vehicle m3 are used to derive the second index value. However, only the distance y or both the distance y and an arbitrary parameter may be used to derive the second index value. For example, in addition to the lateral position and the lateral velocity Vy of the third vehicle m3, the amount of lateral movement of the third vehicle m3 in a predetermined time may be used to derive the second index value. For example, the second index value deriving unit 124 derives a greater second index value as the amount of lateral movement increases.

The second index value deriving unit 124 derives the second index value such that the second index value when the movement direction of the third vehicle m3 in the lateral direction is toward the first lane L1 tends to be greater than when the movement direction of the third vehicle m3 in the lateral direction is not toward the first lane L1. Thereby, the estimation unit 125 estimates a higher probability of lane change of the third vehicle m3 when the movement direction of the third vehicle m3 in the lateral direction is toward the first lane L1 than when the movement direction of the third vehicle m3 in the lateral direction is not toward the first lane L1.

The above example has been described such that TTCs are used to derive the first index value. However, instead of (in addition to) TTCs, at least one of the distance between the two vehicles, a headway time of the two vehicles, or the relative velocity of the two vehicles may be used to derive the first index value.

For example, when the distance between the two vehicles is used to derive the first index value, the first index value tends to increase as the distance between the own-vehicle M and the first vehicle m1 increases, as the distance between the first vehicle m1 and the third vehicle m3 increases, or as the distance between the second vehicle m2 and the third vehicle m3 decreases.

For example, when the relative velocity of the two vehicles is used to derive the first index value, the first index value tends to increase as the relative velocity between the own-vehicle M and the first vehicle m1 decreases or as the velocity of the first vehicle m1 is higher compared to the velocity of the own-vehicle M. Further, the first index value tends to increase as the relative velocity between the first vehicle m1 and the third vehicle m3 decreases or as the velocity of the first vehicle m1 is higher compared to the velocity of the third vehicle m3. The first index value also tends to increase as the relative velocity between the second vehicle m2 and the third vehicle m3 decreases or as the velocity of the third vehicle m3 is higher compared to the velocity of the second vehicle m2.

When the headway time of the two vehicles is used to derive the first index value, the first index value has the same tendency as when TTCs are used to derive the first index value.

In the above example, the first index value deriving unit 123 derives the first index value on the basis of the travel-direction-related relationship between each of the pairs of vehicles excluding the travel-direction-related relationship of the first vehicle m1 and the second vehicle m2. However, the first index value deriving unit 123 may also derive the first index value using the travel-direction-related relationship between the first vehicle m1 and the second vehicle m2. In this case, when the first vehicle m1 is present in front of the second vehicle m2, the first index value may tend to be derived to be greater than when no first vehicle m1 is present in front of the second vehicle m2. The first index value when the TTC (headway time) between the first vehicle m1 and the second vehicle m2 is great may tend to be greater than when the TTC (headway time) is small. When the relative velocity of the second vehicle m2 relative to the first vehicle m1 is greater than zero or equal to zero, a higher first index value may be derived and a higher probability of lane change of the third vehicle m3 may be estimated than when the relative velocity of the second vehicle m2 relative to the first vehicle m1 is less than zero. When the relative velocity of the second vehicle m2 with respect to the first vehicle m1 is positive, an increasing first index value may be derived as the relative velocity increases. Accordingly, an increasing probability of lane change of the third vehicle m3 is estimated.

When an obstacle (for example, a stopped vehicle or a dropped object) is present in front of the third vehicle m3, the estimation unit 125 may estimate a higher probability that the third vehicle m3 will change lanes from the second lane L2 to the first lane L1 than when no obstacle is present. When the lane in front of the third vehicle m3 is closed, the estimation unit 125 may estimate a higher probability that the third vehicle m3 will change lanes from the second lane L2 to the first lane L1 than when the lane is not closed.

The above procedure may be performed even when the first vehicle m1 or the second vehicle m2 is not present. In this case, the process of step S102 in FIG. 5 may be omitted or the first control unit 120 may determine whether or not an arbitrary vehicle is present in the process of step S102. When the first vehicle m1 or the second vehicle m2 is not present, a first index value deriving table 152 corresponding to the case in which the first vehicle m1 or the second vehicle m2 is not present may be used and TTCs or headway times of pairs of the vehicle that is not present and another vehicle and the distance between the two vehicles may be regarded as a sufficiently great value or infinity. Further, when the first vehicle m1 or the second vehicle m2 is not present, the relative velocity may be regarded as zero or a set value for the case in which the first vehicle m1 or the second vehicle m2 is not present may be used.

In the above example, it is assumed that the second index value is derived after the first index value is derived. However, the first index value may also be derived after the second index value is derived. In this case, when the second index value is equal to or less than a first threshold value, the probability of lane change of the third vehicle m3 to the first lane L1 may be estimated to be equal to or less than a predetermined value. When the distance y between the third vehicle and m3 the lane line DL is equal to or less than a second threshold value or when the relative velocity between the own-vehicle M and the third vehicle m3 is equal to or less than a third threshold value (or when the velocity of the own-vehicle M is higher than that of the third vehicle m3), the probability that the third vehicle m3 will change lanes to the first lane L1 may be estimated to be equal to or less than a predetermined value.

As described above, the estimation unit 125 estimates the probability of lane change of the third vehicle m3 on the basis of the first index value derived by the first index value deriving unit 123 and the lateral position of the third vehicle m3 and thus it is possible to more accurately estimate a lane change of the third vehicle m3.

First Modification Example

In a first modification example, the second index value deriving map 154 used when deriving the second index value is switched to a conditional second index value deriving map 155 according to a lighting state of a direction indicator of the third vehicle m3.

Figure 9:
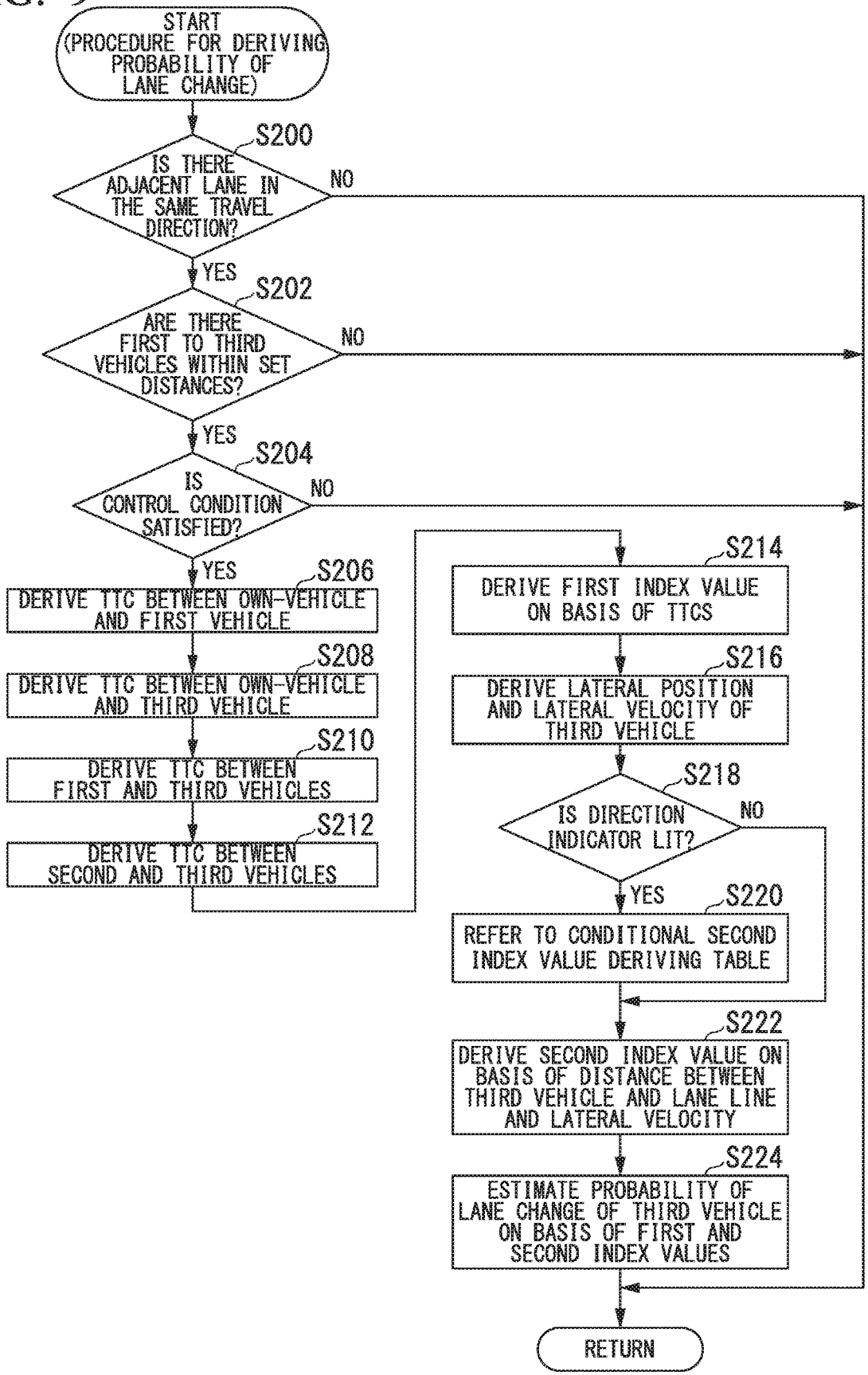
FIG. 9 is a flowchart showing the flow of a procedure performed by a first control unit of a first modification example.

FIG. 9 is a flowchart showing the flow of a procedure performed by the first control unit 120 of the first modification example. The processes of steps S200 to S216 are similar to the processes of steps S100 to S116 in FIG. 5 and thus the descriptions thereof will be omitted.

After the process of step S216, the first control unit 120 determines whether or not the direction indicator of the third vehicle m3 is lit for indicating the intention to change lanes to the first lane L1 on the basis of the recognition result of the external environment recognition unit 121 (step S218).

When the direction indicator of the third vehicle m3 is lit for indicating the intention to change lanes to the first lane L1, the estimation unit 125 changes the map for reference from the second index value deriving map 154 to the conditional second index value deriving map 155 (step S220) and derives a second index value on the basis of the distance y between the third vehicle m and the lane line DL and the lateral velocity Vy of the third vehicle m3 by referring to the conditional second index value deriving map 155 (step S222).

Figure 10:
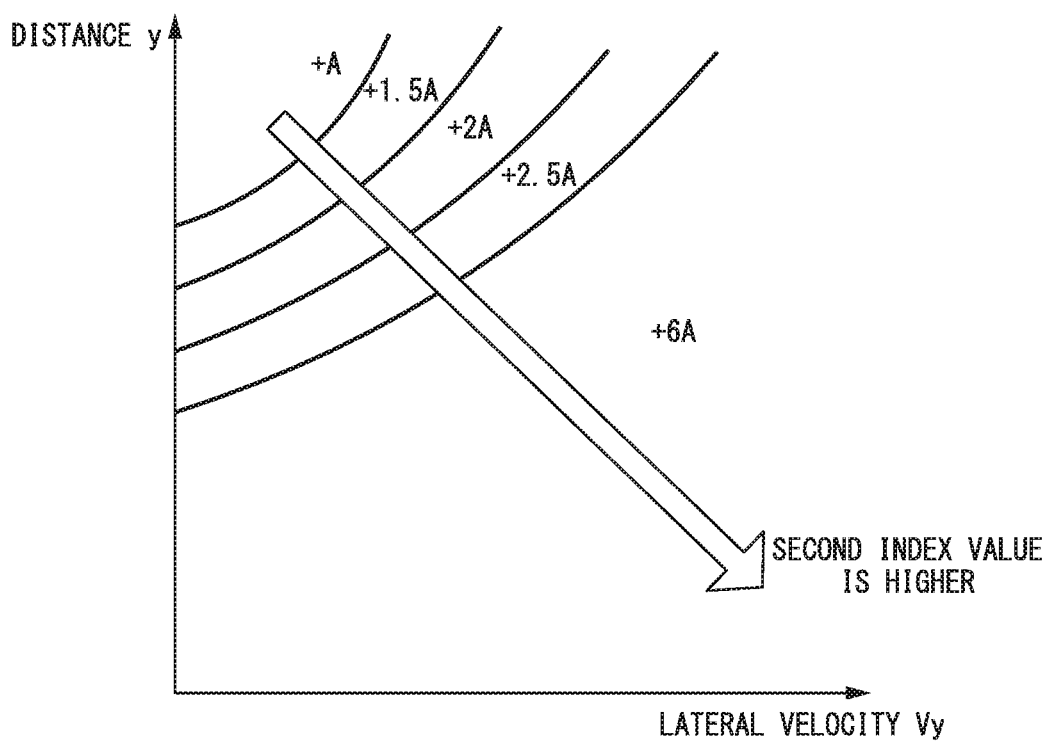
FIG. 10 is a diagram showing an example of a conditional second index value deriving map.

FIG. 10 is a diagram showing an example of the conditional second index value deriving map 155. In the conditional second index value deriving map 155, the distance y and the lateral velocity Vy of the third vehicle m3 are stored in association with the second index value. The conditional second index value deriving map 155 is generated such that the second index value tends to be derived to be greater than with the second index value deriving map 154 even when the relative relationship between the distance y and the lateral velocity Vy of the third vehicle m3 is the same. The conditional second index value deriving map 155 is generated on the basis of the correlations between the second index values, the distances y, and the lateral velocities Vy of the third vehicle m3 previously derived from results of lane change of the third vehicle m3, experimental methods, simulations, or the like when the direction indicator of the third vehicle m3 is lit for indicating the intention to change lanes to the first lane L1. When it is inferred that the third vehicle m3 has the intention to change lanes, a greater second index value is derived than when it is not inferred that the third vehicle m3 has the intention to change lanes and thus it is possible to more accurately derive the probability of lane change.

When the direction indicator of the third vehicle m3 is not lit for indicating the intention to change lanes to the first lane L1, the estimation unit 125 derives a second index value on the basis of the distance y between the third vehicle m and the lane line DL and the lateral velocity Vy of the third vehicle m3 by referring to the second index value deriving map 154 (step S222). Next, the estimation unit 125 estimates the probability of lane change of the third vehicle m3 to the first lane L1 on the basis of the first index value and the second index value by referring to the lane change estimation map 156 (step S224). Then, the procedure of one routine of this flowchart ends.

In addition to the lane change estimation map 156, the conditional lane change estimation map may be stored in the storage unit 150. In this case, when the direction indicator of the third vehicle m3 indicates the intention to change lanes to the first lane L1, the estimation unit 125 may estimate the probability of lane change of the third vehicle m3 by referring to the conditional lane change estimation map. The conditional lane change estimation map is generated such that the probability of lane change tends to be derived to be higher than with the lane change estimation map 156 even when the relative relationship between the first index value and the second index value is the same. The conditional second index value deriving map 155 may be used in addition to the conditional lane change estimation map. When the conditional lane change estimation map is used, the second index value deriving map 154 may be used instead of the conditional second index value deriving map 155. When the conditional lane change estimation map is used, the probability of lane change of the third vehicle m3 is estimated to be higher and thus the probability of lane change is more accurately estimated.

Second Modification Example

Figure 11:
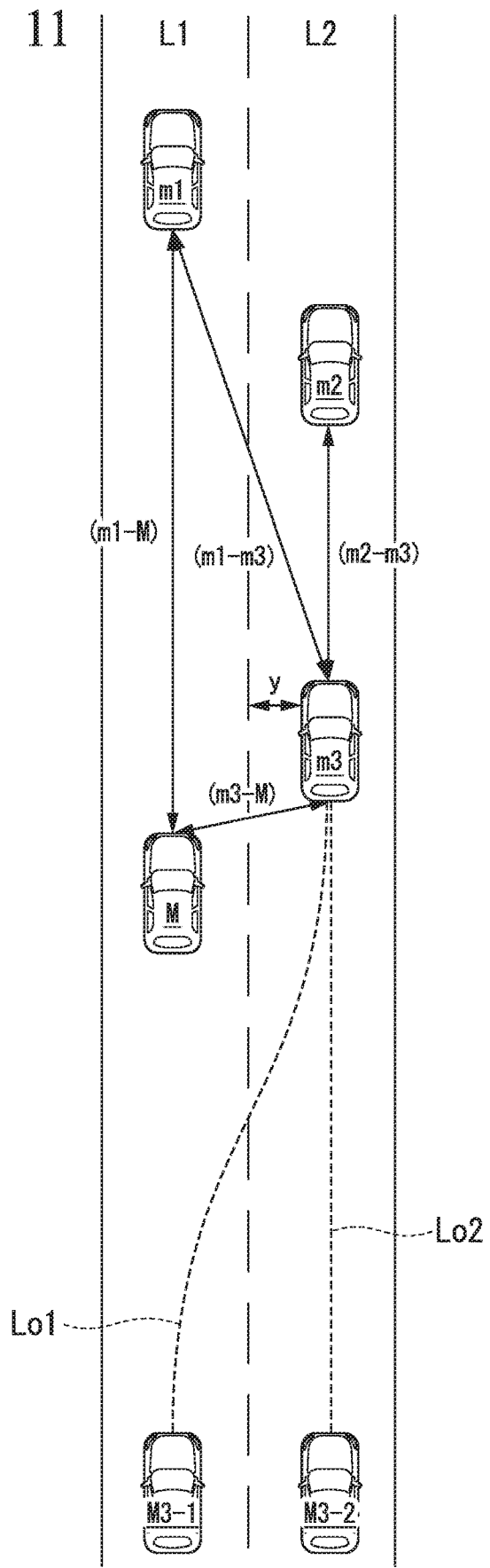
FIG. 11 is a diagram showing an example of a travel history of a third vehicle.

The estimation unit 126 may estimate the probability that the third vehicle m3 will change lanes from the second lane L2 to the first lane L1, further taking into account a travel history of the third vehicle m3. FIG. 11 is a diagram showing an example of the travel history of the third vehicle m3. Descriptions of details similar to those of FIG. 4 will be omitted. In the example shown in FIG. 11, it is assumed that the third vehicle m3 has accelerated and traveled passing (overtaking) the own-vehicle M from behind such that the third vehicle m3 is present in front of the own-vehicle M. When the third vehicle m3 has accelerated and overtaken the own-vehicle M, the estimation unit 126 estimates a higher probability of lane change of the third vehicle m3 than when the third vehicle m3 has overtaken the own-vehicle M without acceleration.

When the third vehicle m3 has overtaken the own-vehicle M as described above, the estimation unit 126 estimates a higher probability of lane change of the third vehicle m3 when the third vehicle m3 has overtaken as shown by a locus Lo1 than when the third vehicle m3 has overtaken as shown by a locus Lo2. The locus Lo1 is a travel locus of the third vehicle m3 when the third vehicle m3 first travels behind the own-vehicle M in the first lane L1 and then overtakes the own-vehicle M after changing lanes to the second lane L2. The locus Lo2 is a travel locus of the third vehicle m3 when the third vehicle m3 first travels behind the own-vehicle M in the second lane L2 and then overtakes the own-vehicle M.

As described above, the estimation unit 126 estimates the probability of lane change of the third vehicle m3 from the second lane L2 to the first lane L1, further taking into account the travel history of the third vehicle m3 and thus it is possible to estimate the probability of lane change of the third vehicle m3 with higher accuracy.

Third Modification Example

When there is a merging lane (or when a lane adjacent to the lane in which the own-vehicle M travels is closed), a virtual vehicle setting unit 123A sets a virtual second vehicle vm2 corresponding to the second vehicle m2. The first index value deriving unit 123 regards the virtual second vehicle vm2 as the second vehicle m2 to derive a first index value.

Figure 12:
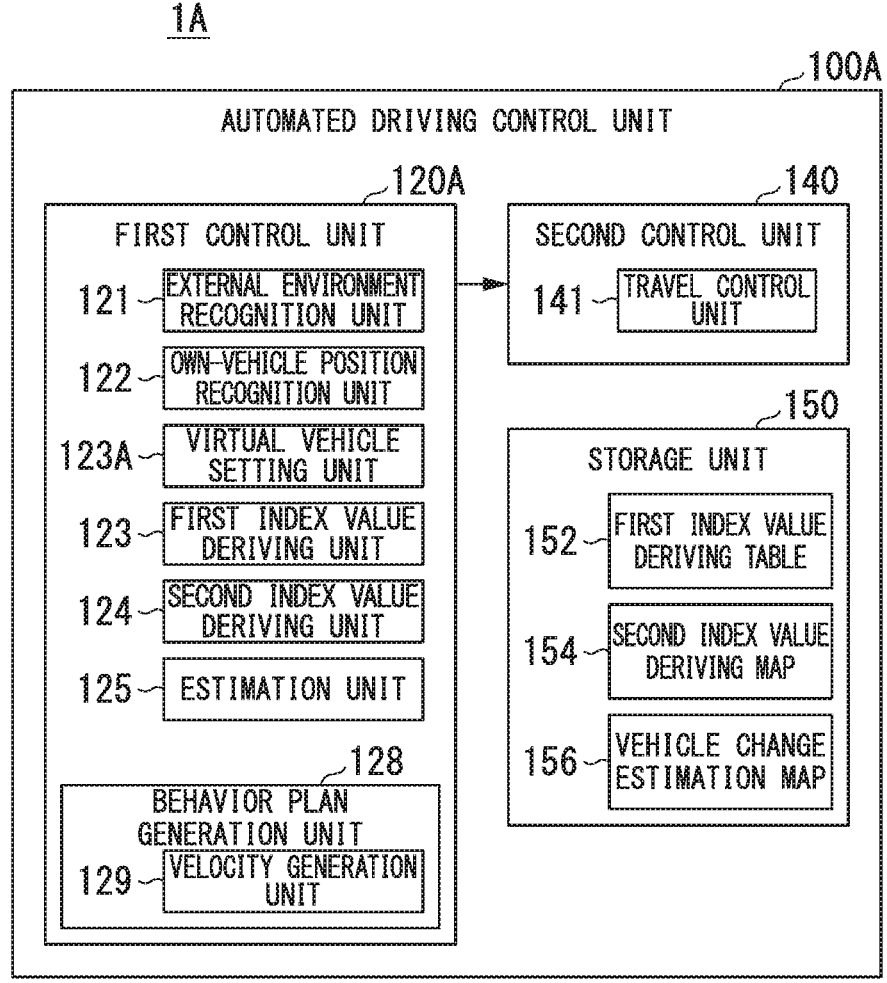
FIG. 12 is a diagram showing functional components of an automated driving control unit of a third modification example.

A vehicle system 1A of a third modification example includes an automated driving control unit 100A instead of the automated driving control unit 100. FIG. 12 is a diagram showing functional components of the automated driving control unit 100A of the third modification example. The automated driving control unit 100A includes, for example, a first control unit 120A. The first control unit 120A includes a virtual vehicle setting unit 123A in addition to the functional components of the first control unit 120.

Figure 13:
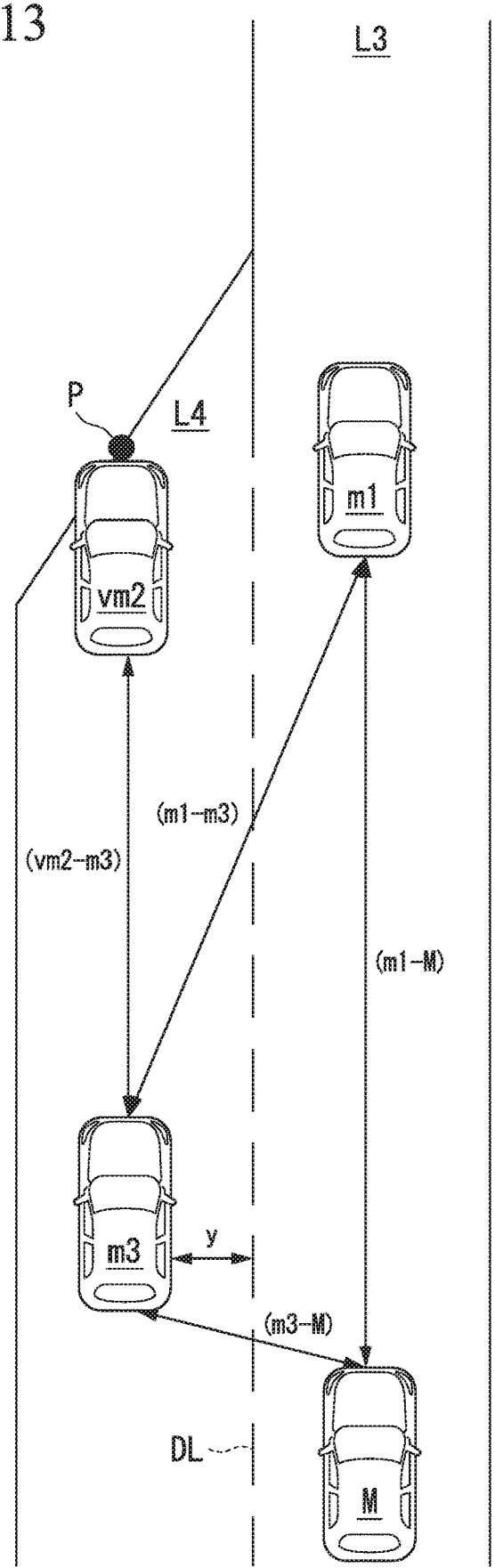
FIG. 13 is a diagram showing an example of a scenario in which there is a merging lane.

FIG. 13 is a diagram showing an example of a scenario in which there is a merging lane. On the basis of the recognition results of the external environment recognition unit 121 and the own-vehicle position recognition unit 122, the first control unit 120 recognizes the own-vehicle M, a first vehicle m1 present in front of the own-vehicle M in a third lane L3 in which the own-vehicle M is present, and a third vehicle m3 traveling in a merging lane L4 (a fourth lane) connected to (adjacent to) the third lane L3.

The virtual vehicle setting unit 123A sets a virtual second vehicle vm2 on the basis of a point P at which the merging lane L4 is closed. The first index value deriving unit 123 derives a first index value according to a traveling-direction-related relationship between each of a plurality of pairs of vehicles, each pair including two vehicles among the own-vehicle M, the first vehicle m1 present in front of the own-vehicle M in the third lane L3 in which the own-vehicle M is present, the virtual second vehicle vm2 which is present in front of the own-vehicle M and travels in the fourth lane L4, and the third vehicle m3 present behind the virtual second vehicle vm2 in the fourth lane L4.

Figure 14:
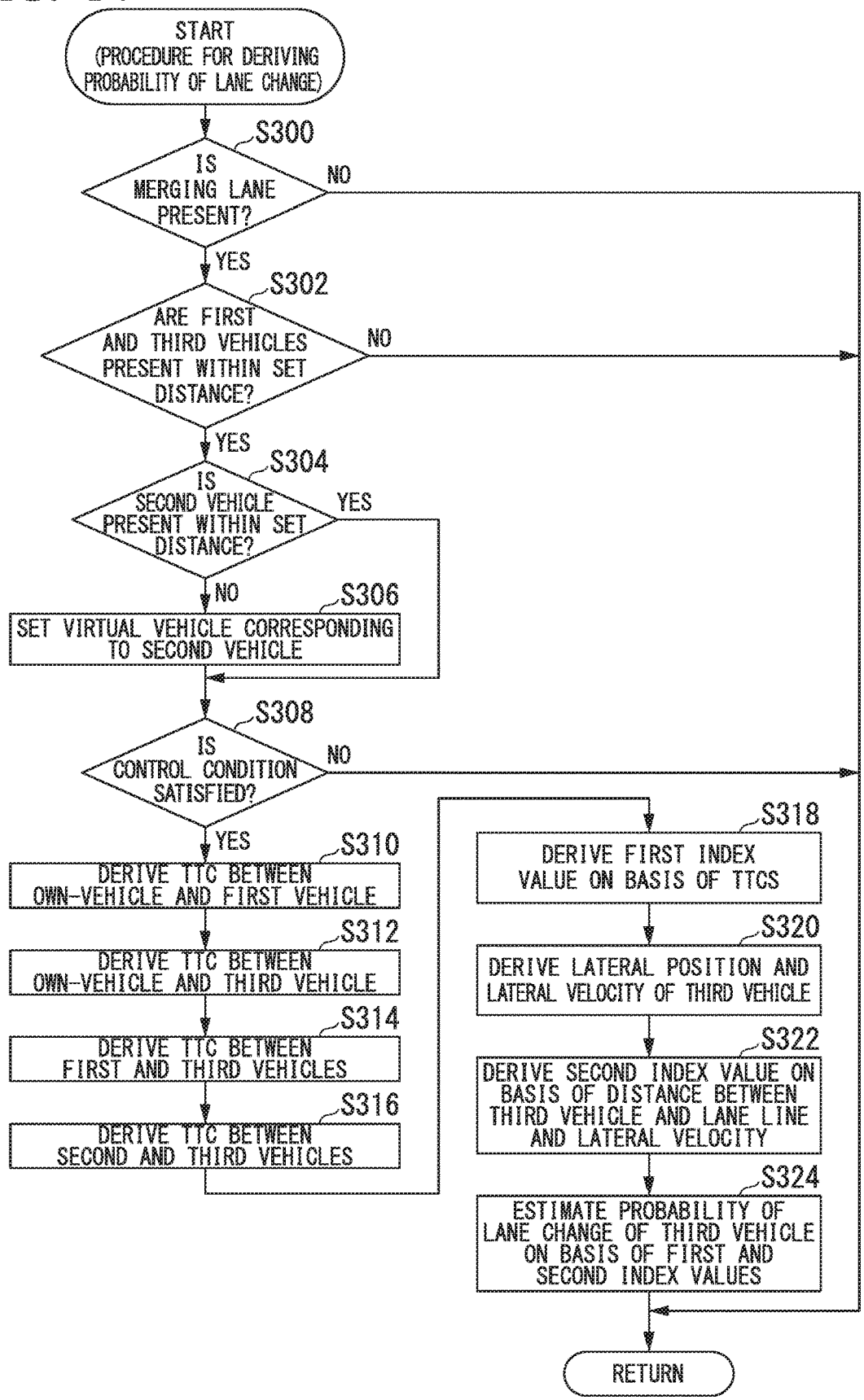
FIG. 14 is a flowchart showing the flow of a procedure performed by a first control unit.

FIG. 14 is a flowchart showing the flow of a procedure performed by the first control unit 120. This procedure is performed at predetermined intervals. Each process of the procedure will be described below with reference to FIG. 13 described above.

First, the first control unit 120 determines whether or not a merging lane L4 is present in front of the own-vehicle M within a predetermined distance on the basis of the current position of the own-vehicle M and information acquired from the second map information 62 (step S300). When no merging lane L4 is present, the procedure of one routine of this flowchart ends.

When a merging lane L4 is present, the first control unit 120 determines whether or not a first vehicle m1 and a third vehicle m3 are present within a predetermined distance from the own-vehicle M on the basis of the recognition results of the external environment recognition unit 121 and the own-vehicle position recognition unit 122 (step S302). When a first vehicle m1 and a third vehicle m3 are not present within the predetermined distance from the own-vehicle M, the procedure of one routine of this flowchart ends.

When a first vehicle m1 and a third vehicle m3 are present within the predetermined distance from the own-vehicle M, the first control unit 120 determines whether or not a second vehicle m2 is present within a set distance (step S304). When a second vehicle m2 is present within the set distance, the processes of steps S308 to S324 are performed. The processes of steps S308 to S324 are similar to those (of steps S104 to S120) in the flowchart of FIG. 5. When a second vehicle m2 is present within the set distance, the procedure of one routine of this flowchart may end. This is because when a second vehicle m2 is present at the location where the merging lane L4 is present, it is necessary to estimate the probability of lane change of the second vehicle m2 and a procedure different from this procedure is applied.

When a second vehicle m2 is not present within the set distance, the virtual vehicle setting unit 123A sets a virtual second vehicle vm2 at the point P at which the merging lane L4 is closed (step S306). Next, the estimation unit 125 determines whether or not a predetermined control condition is satisfied (step S308). When the predetermined control condition is not satisfied, the procedure of one routine of this flowchart ends.

When the predetermined control condition is satisfied, the first index value deriving unit 123 derives a TTC (m1-M) between the own-vehicle M and the first vehicle m1 (step S310). Next, the first index value deriving unit 123 derives a TTC (M-m3) between the own-vehicle M and the third vehicle m3 (step S312), derives a TTC (m1-m3) between the first vehicle m1 and the third vehicle m3 (step S314), and derives a TTC (vm2-m3) between the virtual second vehicle vm2 and the third vehicle m3 (step S316).

Next, the estimation unit 125 derives the first index value on the basis of the TTCs derived by the above processes and the first index value deriving table 152 (step S318).

Since the processes of steps S320 to S324 of this procedure are similar to the processes of steps 116 to 120 of FIG. 5, descriptions thereof will be omitted here.

Through the procedure described above, when the adjacent lane is closed, the virtual vehicle setting unit 123A sets a virtual line from the point at which the lane is closed. Then, the estimation unit 126 estimates the probability of lane change of the third vehicle m3 using an index value derived by the first index value deriving unit 123 which indicates the traveling-direction-related relationship between each pair of vehicles among the own-vehicle M, the first vehicle m1, the virtual second vehicle vm2, and the third vehicle m3, and thus it is possible to estimate more accurately the probability of lane change.

[Velocity Control]

Figure 15:
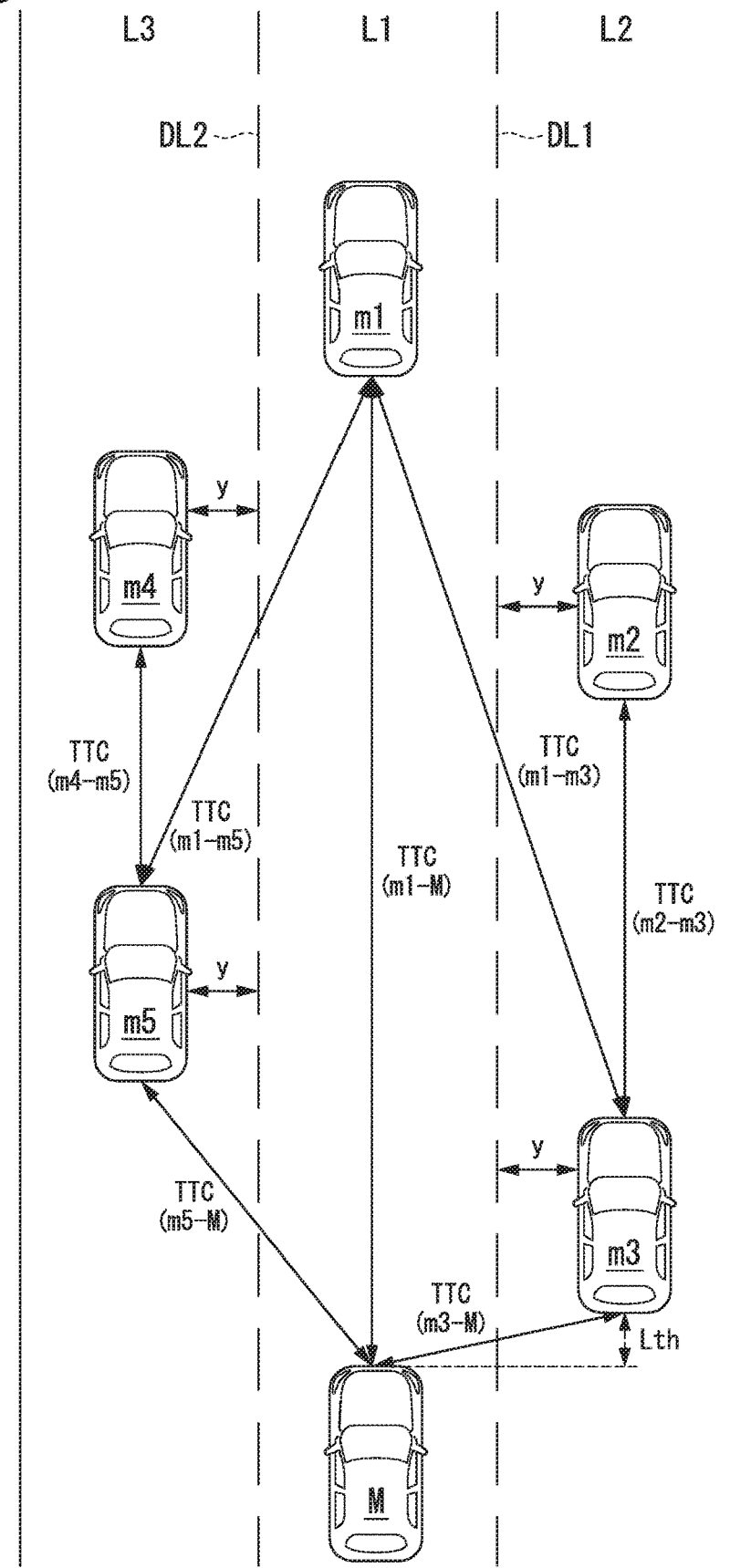
FIG. 15 is a diagram showing velocity control.

FIG. 15 is a diagram showing velocity control. On the basis of information input from the camera 10, the radar device 12, and the finder 14 via the object recognition device 16, the external environment recognition unit 121 recognizes a first vehicle m1 that travels in front of the own-vehicle M in a first lane L1 in which the own-vehicle M travels and a vehicle B which travels between the first vehicle m1 and the own-vehicle M in the travel direction in a second lane L2 adjacent to the first lane LE The first vehicle m1 is an example of a "vehicle A." A second vehicle m2 or a third vehicle m3 is an example of the "vehicle B."

On the basis of information input from the camera 10, the radar device 12, and the finder 14 via the object recognition device 16, the external environment recognition unit 121 recognizes a vehicle C which travels between the first vehicle m1 and the own-vehicle M in the travel direction in a third lane L3 which is adjacent to the first lane L1 at the side opposite to the second lane L2. A fourth vehicle m4 or a fifth vehicle m5 is an example of the "vehicle C." Hereinafter, one or more vehicles B and one or more vehicles C may sometimes be collectively referred to as "target vehicles."

The velocity generation unit 129 controls the velocity of the own-vehicle M on the basis of the velocity of the first vehicle m1 and estimation results of the estimation unit 125 (for example, the probability that one or more target vehicles among the second to fifth vehicles m2 to m5 will change lanes to the first lane). The velocity generation unit 129 controls the velocity of the own-vehicle M on the basis of the velocity of the first vehicle m1 and the probability of lane change of a target vehicle which has a high probability of changing lanes to the first lane among the estimation results of the estimation unit 125.

Figure 16:
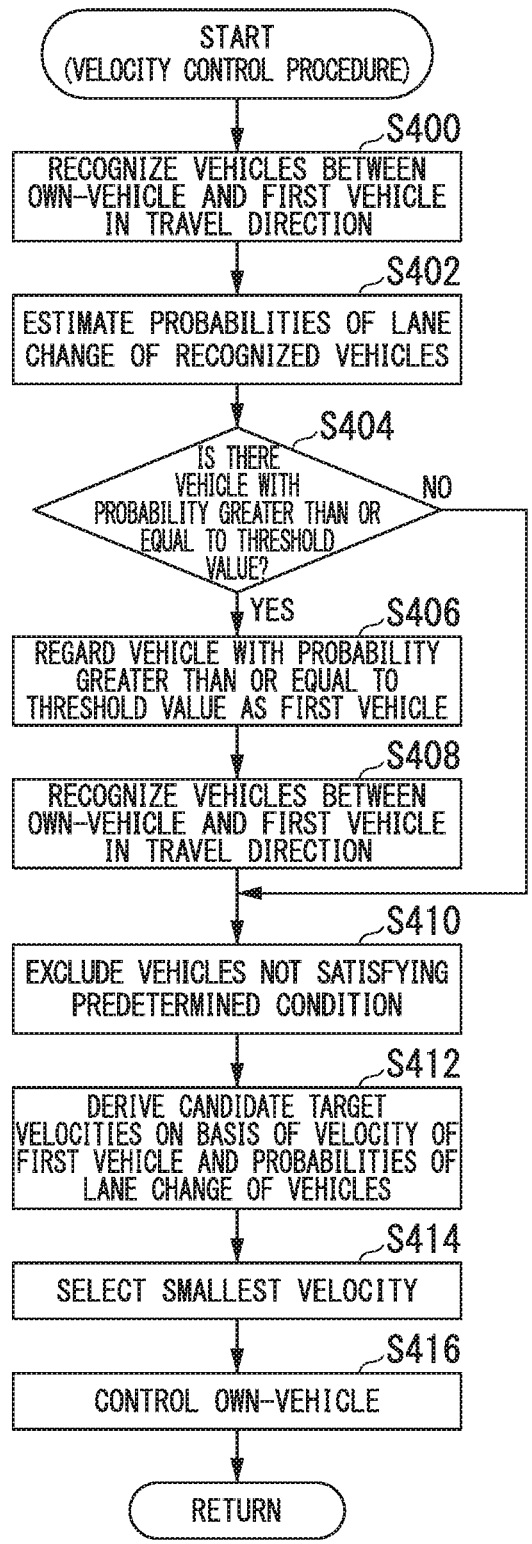
FIG. 16 is a flowchart showing the flow of a velocity control procedure performed by the first control unit.

FIG. 16 is a flowchart showing the flow of a velocity control procedure performed by the first control unit 120. First, the external environment recognition unit 121 recognizes vehicles which are present between the own-vehicle M and the first vehicle m1 in the travel direction of the own-vehicle M (step S400). The vehicles present between the own-vehicle M and the first vehicle m1 are the second to fifth vehicles m2 to m5 in the example of FIG. 15. When the first vehicle m is not present within a predetermined distance from the own-vehicle M, vehicles present within the predetermined distance from the own-vehicle M are recognized as target vehicles in this procedure. The predetermined distance is a distance set according to the velocity of the own-vehicle M, a target velocity, or the like.

Vehicles present between the own-vehicle M and the first vehicle m1 may be excluded from the target vehicles when rear ends of the vehicles are not in front of a front end of the own-vehicle M in the travel direction. Vehicles present between the own-vehicle M and the first vehicle m1 may also be excluded from the target vehicles when the distances from rear ends of the vehicles to the front end of the own-vehicle M are not greater than or equal to a predetermined distance Lth shown in FIG. 15. Such exclusion of vehicles present at distances not greater than or equal to the predetermined distance Lth can suppress meaningless changes in the behavior of the vehicle due to erroneous detection of sensors such as the radar device 12 and the finder 14. Thus, it is possible to reduce a processing load.

Next, the estimation unit 125 estimates the probability of lane change of the second to fifth vehicles m2 to m5 recognized by the external environment recognition unit 121 (step S402). For example, the estimation unit 125 estimates the probabilities of lane change of the second to fifth vehicles m2 to m5 to the first lane L1 on the basis of the idea of the procedure described in the above section "Procedure for estimating probability of lane change."

In the description of the above section "Procedure for estimating probability of lane change," methods for estimating the probabilities of lane change of the second vehicle m2 and the fourth vehicle m4 have not been described in detail, but the probabilities of lane change may be estimated in the following manner. For example, when estimating the probability of lane change of the second vehicle m2, the estimation unit 125 regards the second vehicle m2 as the third vehicle m3 and regards, if a vehicle is present in front of the second vehicle m2, the vehicle as the second vehicle m2 to estimate the probability of lane change of the second vehicle m2 which is assumed as the third vehicle m3. When no vehicle is present in front of the second vehicle m2, the procedure is performed in the same manner as when no vehicle is present in front of the third vehicle m3. The probability of lane change of the fourth vehicle m4 is estimated similar to that of the second vehicle m2. The second vehicle m2 and the third vehicle m3 may also not be subjected to the procedure. The procedure for estimating the probability of lane change is only an example and other known methods may be used.

Next, the first control unit 120 determines whether or not there is a vehicle with a probability of lane change greater than or equal to a threshold value (for example, 0.9 or 1.0) among the estimation results of the estimation unit 125 (step S404). When there is no vehicle with a probability of lane change greater than or equal to the threshold value, the procedure proceeds to step S410.

When there is a vehicle with a probability of lane change greater than or equal to the threshold value, the first control unit 120 regards as a first vehicle the vehicle which is determined to have a probability of lane change greater than or equal to the threshold value in step S404, instead of the vehicle which is set as the first vehicle m1 in step S400 (step S406). For example, when a vehicle present in the second lane L2 or the third lane L3 adjacent to the first lane L1 is approaching a lane line DL1 or DL2 (or when a vehicle present in the second lane L2 or the third lane L3 adjacent to the first lane L1 has approached the lane line DL 1 or DL 2 within a predetermined distance from the lane line DL 1 or DL 2) or when the vehicle has entered the first lane L1, the vehicle is regarded as a vehicle which has changed lanes to the first lane L1 and is set as the first vehicle m1. When it is determined that the probability of lane change of a plurality of vehicles is greater than or equal to the threshold value, for example, a vehicle closest to the own-vehicle M may be regarded as the first vehicle. Then, the first control unit 120 recognizes vehicles which are present between the own-vehicle M and the vehicle regarded as the first vehicle m1 in step S406 in the travel direction of the own-vehicle M (step S408).

Next, the first control 130 excludes vehicles that do not satisfy a predetermined condition among the vehicles recognized in step S400 or S408 (step S410). The predetermined condition is, for example, that the relative velocity with respect to the own-vehicle M is positive or zero. The predetermined condition may be, for example, that the probability of lane change to the first lane L1 in the estimation results of the estimation unit 125 is greater than the threshold value. The predetermined condition may also be that the relative velocity with respect to the own-vehicle M is zero or that the relative velocity with respect to the own-vehicle M is positive and the relative velocity with respect to the own-vehicle M or the first vehicle m1 is within a predetermined range. The predetermined condition may be a combination of the above conditions.

Next, the velocity generation unit 129 derives candidate target velocities of the own-vehicle M on the basis of the velocity of the first vehicle m1 and the probabilities of lane change of vehicles which have not been excluded in step S410 (step S412). For example, the velocity generation unit 129 derives candidate target velocities on the basis of the velocities and the probabilities of lane change of the second to fifth vehicles m2 to m5 on the basis of the following expression (1). In this expression, "Vego_mn" is a candidate target velocity of the own-vehicle M which is determined on basis of target vehicle n, where "n" indicates the target vehicle (i.e., any one of the second to fifth vehicles m5). "Pmn" is a probability (for example, a probability value indicated by 0.0 to 1.0) that the target vehicle present in the adjacent lane will change lanes to the first lane, "Vm1" is the velocity of the first vehicle m1, and "Vmn" is the velocity of the target vehicle.

$$Vego\_mn=(1-Pmn)Vm1+PmnVmn \qquad (1)$$

Next, the velocity generation unit 129 selects the smallest of the plurality of candidate target velocities derived in step S410 as the target velocity (step S414). The velocity generation unit 129 controls the own-vehicle M on the basis of the target velocity selected in step S414 (step S416). Then, the procedure of one routine of this flowchart ends.

As the probability of lane change of the target vehicle increases, the value of the first term of equation (1) tends to get closer to zero and the value of the second term tends to get closer to the velocity of the target vehicle. For example, when the first to fifth vehicles m1 to m5 are traveling at the same velocity and the third vehicle m3 has the highest probability of lane change, the candidate target velocity obtained with respect to the third vehicle m3 in equation (1) is the smallest. Then, the velocity generation unit 129 determines the target velocity on the basis of the equation (1) and controls the velocity of the own-vehicle M on the basis of the determined target velocity. Thus, even when a vehicle having a high probability of changing lanes to the first lane L1, the velocity of the own-vehicle M is controlled such that the own-vehicle M smoothly follows the vehicle which has changed lanes. In this manner, the first control unit 120 can perform velocity control with less uncomfortable feeling in accordance with behaviors of nearby vehicles changing lanes.

In the above description, the procedure in which the velocity generation unit 129 controls the velocity of the own-vehicle M on the basis of the velocity of the first vehicle m1 and the probability of lane change of a target vehicle which has a high probability of lane change to the first lane L1 among the estimation results of the estimation unit 125 has been described as being applied to automated driving vehicles. However, without being limited to this, the procedure may be applied to vehicles which travel following a preceding vehicle which travels in front of the own-vehicle M. In this case, the own-vehicle M is controlled on the basis of the velocity determined by the velocity generation unit 129.

According to the above embodiment, the external environment recognition unit 121 configured to recognize a first vehicle m1 traveling in front of the own-vehicle in a first lane L1 in which the own-vehicle M travels and a vehicle B traveling between the first vehicle m1 and the own-vehicle M in the travel direction in a second lane L2 adjacent to the first lane L1, both of the vehicles being detected by the camera 10, the radar device 12, and the finder 14 which detect surrounding situations of the own-vehicle, the estimation unit 125 configured to estimate the probability that the vehicle B recognized by the external environment recognition unit 121 will change lanes to the first lane L1, and the first control unit 120 (or the velocity generation unit 129) configured to control the velocity of the own-vehicle M on the basis of the velocity of the first vehicle m1 and the estimation result of the estimation unit 125 are provided and thus it is possible to perform velocity control with less uncomfortable feeling in accordance with behaviors of nearby vehicles changing lanes.

According to the embodiments described above, the first index value deriving unit 123 configured to derive a first index value according to a traveling-direction-related relationship between each of a plurality of pairs of vehicles, each pair including two vehicles among the own-vehicle M, a first vehicle m1 traveling in front of the own-vehicle M in a first lane L1 in which the own-vehicle M travels, a second vehicle m2 (or a virtual second vehicle vm2) traveling in front of the own-vehicle M in a second lane L2 adjacent to the first lane L1, and a third vehicle m3 traveling behind the second vehicle m2 in the second lane L2 on the basis of surrounding situations of the own-vehicle M detected by the camera 10, the radar device 12, or the finder 14 which detect the surrounding situations of the own-vehicle, and the estimation unit 125 configured to estimate a probability of lane change of the third vehicle m3 on the basis of the first index value derived by the first index value deriving unit 123 and a lateral position of the third vehicle m3 are provided and thus it is possible to more accurately derive the probabilities of lane change of nearby vehicles.

Although the modes for carrying out the present invention have been described above by way of embodiments, the present invention is not limited to these embodiments at all and various modification examples and substitutions can be made without departing from the gist of the present invention.

What is claimed is:

1. A lane change estimation device comprising:
    a processor; and
    a memory that stores executable instructions that, when executed by the processor, perform operations, comprising:
    detecting a surrounding situation of an own-vehicle;
    determining a first index value, on the basis of the detected surrounding situation of the own-vehicle, based on a traveling-direction-related relationship between a pair of vehicles of a plurality of pairs of vehicles, the pair of vehicles including two vehicles among the own-vehicle, a first vehicle is detected to travel in front of the own-vehicle in a first lane in which the own-vehicle travels, a second vehicle is detected to travel in front of the own-vehicle in a second lane adjacent to the first lane, and a third vehicle is detected to travel behind the second vehicle in the second lane; and
    determining a probability of a lane change by the third vehicle based on the first index value and a lateral position of the third vehicle,
    wherein the first index value is determined based on a first time until the own-vehicle approaches the first vehicle within a predetermined distance and a second time until the second vehicle approaches the third vehicle within the predetermined distance, and
    wherein a higher probability of the lane change by the third vehicle is determined based on the first time being longer than the second time rather than the first time being shorter than the second time.

2. The lane change estimation device according to claim 1, wherein the operations further comprise
    determining a second index value relating to the third vehicle based on the lateral position of the third vehicle and at least one of an amount of lateral movement of the third vehicle in a predetermined period or a velocity of lateral movement of the third vehicle, and
    determining the probability of the lane change by the third vehicle based on the first index value and the second index value.

3. The lane change estimation device according to claim 1,
    wherein the first index value is determined based on one or more of a group of values comprising a time until the the pair of vehicles approach a predetermined distance from the own-vehicle, a distance between the pair of vehicles, a headway time of the pair of vehicles, and a relative velocity of the pair of vehicles.

4. The lane change estimation device according to claim 1, wherein the operations further comprise
    determining a higher probability of the lane change by the third vehicle based on a relative velocity of the second vehicle with respect to the first vehicle being greater than zero or equal to zero rather than the relative velocity of the second vehicle with respect to the first vehicle being less than zero.

5. The lane change estimation device according to claim 1,
    wherein the operations further comprise determining the first index value based on a travel-direction-related relationship between the pair of vehicles of the plurality of vehicles, wherein the travel-direction-related relationship of the first vehicle and the second vehicle is excluded.

6. The lane change estimation device according to claim 1,
    wherein the operations further comprise determining a higher probability of the lane change by the third vehicle based on a movement direction of the third vehicle in a lateral direction being toward the first lane rather than the movement direction of the third vehicle in the lateral direction being away from the first lane.

7. The lane change estimation device according to claim 1,
    wherein the operations further comprise determining a higher probability of the lane change by the third vehicle based on a direction indicator of the third vehicle indicating an intention to enter the first lane rather than the direction indicator not indicating the intention to enter the first lane.

8. The lane change estimation device according to claim 1,
    wherein the operations further comprise determining a higher probability of the lane change by the third vehicle based on an obstacle being present in front of the third vehicle rather than the obstacle not being present in front of the third vehicle.

9. The lane change estimation device according to claim 1,
    wherein the operations further comprise determining a higher probability of the lane change the third vehicle based on a lane in front of the third vehicle being closed rather than the lane in front of the third vehicle being open.

10. The lane change estimation device according to claim 2,
    wherein the first index value is determined based on one or more of a group of values comprising a time until the pair of vehicles approach within a predetermined distance, a distance between the pair of vehicles, a headway time of the pair of vehicles, and a relative velocity of the pair of vehicles.

11. The lane change estimation device according to claim 2,
    wherein the operations further comprise determining a higher probability of the lane change the third vehicle based on a relative velocity of the second vehicle with respect to the first vehicle being greater than zero or equal to zero rather than the relative velocity of the second vehicle with respect to the first vehicle being less than zero.

12. The lane change estimation device according to claim 2, wherein the operations further comprise determining the first index value based on a travel-direction-related relationship between the pair of vehicles of the plurality of vehicles excluding the travel-direction-related relationship of the first vehicle and the second vehicle.

13. The lane change estimation device according to claim 2, wherein the operations further comprise determining a higher probability of the lane change by the third vehicle based on a movement direction of the third vehicle in a lateral direction being toward the first lane rather than the movement direction of the third vehicle in the lateral direction being away from the first lane.

14. The lane change estimation device according to claim 2, wherein the operations further comprise determining a higher probability of the lane change by the third vehicle based on a direction indicator of the third vehicle indicating an intention to enter the first lane rather than the direction indicator not indicating the intention to enter the first lane.

15. The lane change estimation device according to claim 2, wherein the operations further comprise determining a higher probability of the lane change by the third vehicle based on an obstacle being present in front of the third vehicle rather than the obstacle not being present in front of the third vehicle.

16. The lane change estimation device according to claim 2, wherein the operations further comprising determining a higher probability of the lane change by the third vehicle based on a lane in front of the third vehicle being closed rather than the lane in front of the third vehicle being open.

17. A lane change estimation method comprising:
an in-vehicle computer comprising a processor:
detecting a surrounding situation of an own-vehicle;
determining a first index value, on the basis of the detected surrounding situation of the own-vehicle, based on a traveling-direction-related relationship between a pair of vehicles of a plurality of pairs of vehicles, the pair of vehicles including two vehicles among the own-vehicle, a first vehicle is detected to travel in front of the own-vehicle in a first lane in which the own-vehicle travels, a second vehicle is detected to travel in front of the own-vehicle in a second lane adjacent to the first lane, and a third vehicle is detected to travel behind the second vehicle in the second lane; and
determining a probability of a lane change by the third vehicle based on the first index value and a lateral position of the third vehicle,
wherein the first index value is determined based on a first time until the own-vehicle approaches the first vehicle within a predetermined distance and a second time until the second vehicle approaches the third vehicle within the predetermined distance, and
wherein a higher probability of the lane change by the third vehicle is determined based on the first time being longer than the second time rather than the first time being shorter than the second time.

18. A non-transitory computer readable medium configured to store a vehicle control program causing an in-vehicle computer to perform operations, comprising:
detecting a surrounding situation of an own-vehicle;
determining a first index value, on the basis of the detected surrounding situation of the own-vehicle, based on a traveling-direction-related relationship between a pair of vehicles of a plurality of pairs of vehicles, the pair of vehicles including two vehicles among the own-vehicle, a first vehicle is detected to travel in front of the own-vehicle in a first lane in which the own-vehicle travels, a second vehicle is detected to travel in front of the own-vehicle in a second lane adjacent to the first lane, and a third vehicle is detected to travel behind the second vehicle in the second lane; and
determining a probability of a lane change by the third vehicle based on the first index value and a lateral position of the third vehicle,
wherein the first index value is determined based on a first time until the own-vehicle approaches the first vehicle within a predetermined distance and a second time until the second vehicle approaches the third vehicle within the predetermined distance, and
wherein a higher probability of the lane change by the third vehicle is determined based on the first time being longer than the second time rather than the first time being shorter than the second time.

* * * * *